(12) United States Patent
Ceroll et al.

(10) Patent No.: US 6,250,190 B1
(45) Date of Patent: *Jun. 26, 2001

(54) MOVABLE FENCE FOR A MACHINE TOOL

(75) Inventors: Warren A. Ceroll, Owings Mills; Robert S. Gehret, Hampstead; Daniel Puzio, Baltimore; Frederick R. Bean, Finksburg; Michael L. O'Banion, Westminster, all of MD (US); David A. Porter, Hanover, PA (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,373

(22) Filed: Apr. 9, 1998

Related U.S. Application Data

(62) Division of application No. 08/883,749, filed on Jun. 27, 1997, now Pat. No. 5,927,857, which is a continuation of application No. 08/541,389, filed on Oct. 10, 1995, now Pat. No. 5,722,308.

(51) Int. Cl.[7] .................................................. B27B 27/10
(52) U.S. Cl. ......................... 83/438; 83/468.7; 83/477.2; 269/318
(58) Field of Search .................................. 83/438, 468.7, 83/477.2, 522.18, 522.19, 468; 269/303, 315, 318, 297, 298, 301, 304; 44/253.1, 253.5, 286.1, 286.5, 287

(56) References Cited

U.S. PATENT DOCUMENTS

| | | |
|---|---|---|
| 412,452 | 10/1889 | Beugler . |
| 843,591 | 2/1907 | Edwards . |
| 1,938,548 | 12/1933 | Tautz . |
| 2,166,703 | 7/1939 | Boice . |
| 2,548,279 | 4/1951 | Young . |
| 2,744,549 * | 5/1956 | Johnson . |
| 2,806,493 | 9/1957 | Gaskell . |
| 2,808,084 * | 10/1957 | Eschenburg et al. .................. 83/438 |
| 2,852,049 | 9/1958 | Peterson . |
| 3,428,307 * | 2/1969 | Hunter et al. . |
| 4,128,029 | 12/1978 | Gay et al. . |
| 4,206,910 | 6/1980 | Blesemeyer . |
| 4,248,115 * | 2/1981 | Brodbeck . |
| 4,367,668 | 1/1983 | Jensen . |
| 4,521,006 | 6/1985 | Waters . |
| 4,566,510 * | 1/1986 | Bartlett et al. .................. 83/477.2 X |
| 4,593,590 * | 6/1986 | Gray . |
| 4,600,184 | 7/1986 | Ashworth . |
| 4,658,687 | 4/1987 | Haas et al. . |
| 4,677,920 | 7/1987 | Eccardt . |
| 4,696,213 | 9/1987 | Conneally . |
| 4,726,405 * | 2/1988 | Bassett ............................. 269/303 X |
| 4,846,036 | 7/1989 | Metzger, Jr. et al. . |

(List continued on next page.)

FOREIGN PATENT DOCUMENTS 0 142 368 B1  7/1990  (EP) .

Primary Examiner—Kenneth E. Peterson
(74) Attorney, Agent, or Firm—Harness, Dickey & Pierce, P.L.C.

(57) ABSTRACT

An adjustable rip fence for a machine tool has a fence which is movable with respect to the cutting tool due to a rack and pinion. The rail assembly supporting the fence include a pair of stationary rails which are secure to the machine tool. Aeach stationary rail and the movement of each rail is accomplished by the rotation of a pair of pinion gears each of which engages a respective rack on the movable rails. The simultaneous rotation of the pinion gears is the result of both pinion gears being secured to a common pinion shaft which is rotatably secured to the machine tool. The telescoping nature of the rails allows for adjustment of the fence beyond the working surface of the machine tool.

15 Claims, 23 Drawing Sheets

U.S. PATENT DOCUMENTS

| | | |
|---|---|---|
| 4,964,450 | 10/1990 | Hughes et al. . |
| 5,018,562 | 5/1991 | Adams . |
| 5,078,373 | 1/1992 | Miller . |
| 5,098,000 | 3/1992 | Rumpf et al. . |
| 5,123,317 | 6/1992 | Barnes, Jr. et al. . |
| 5,181,446 | 1/1993 | Theising . |
| 5,421,231 * | 6/1995 | Break et al. . |
| 5,460,070 | 10/1995 | Buskness . |
| 5,782,279 * | 7/1998 | Stecker, Sr. . |
| 5,890,524 * | 4/1999 | Tucker . |

* cited by examiner

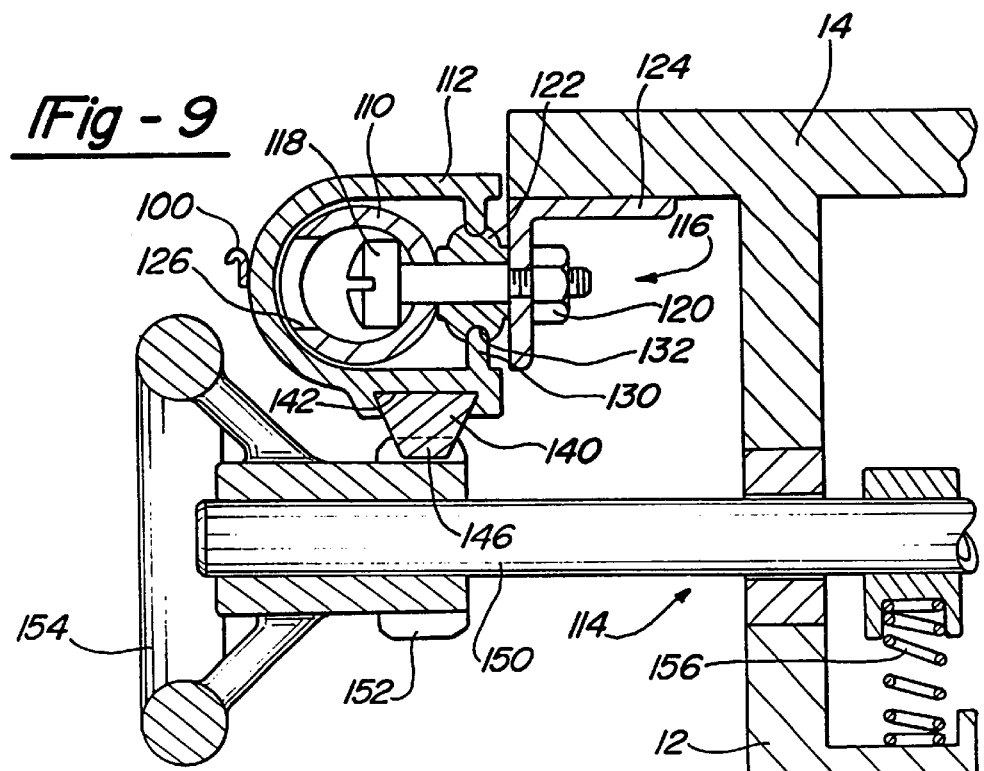
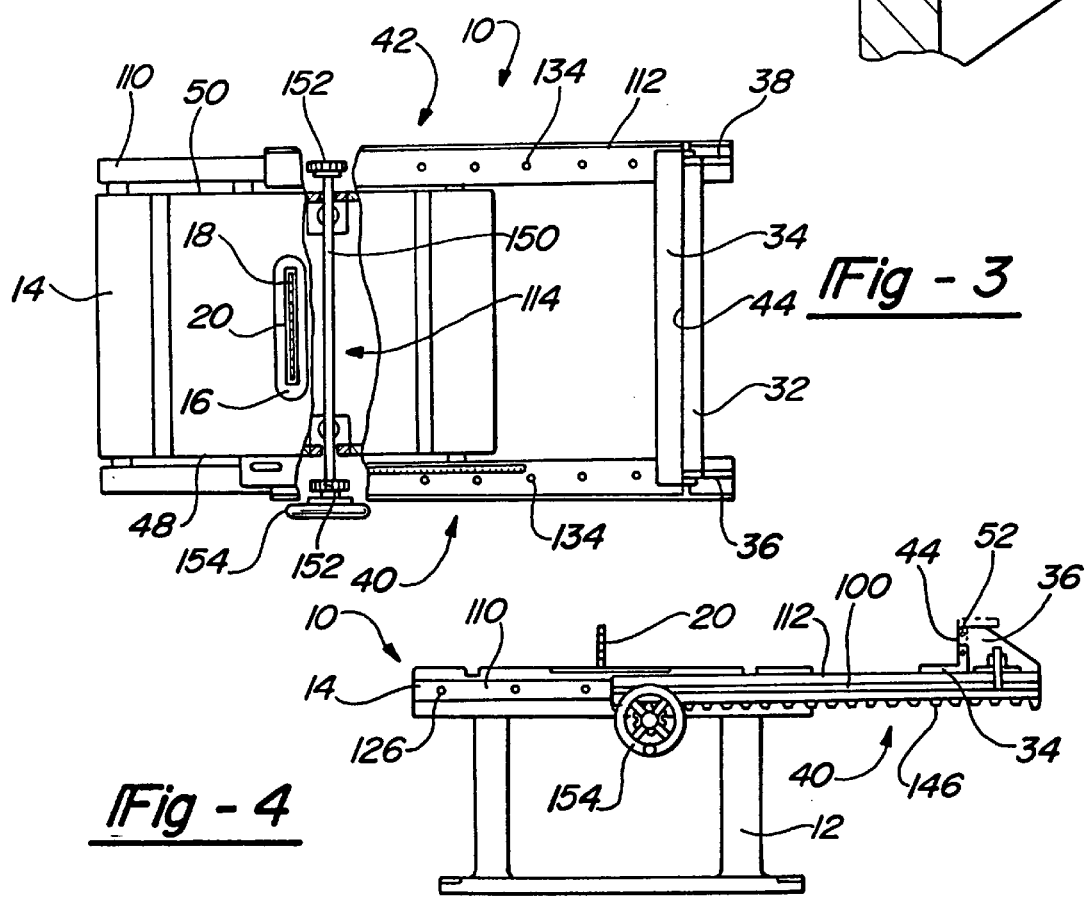

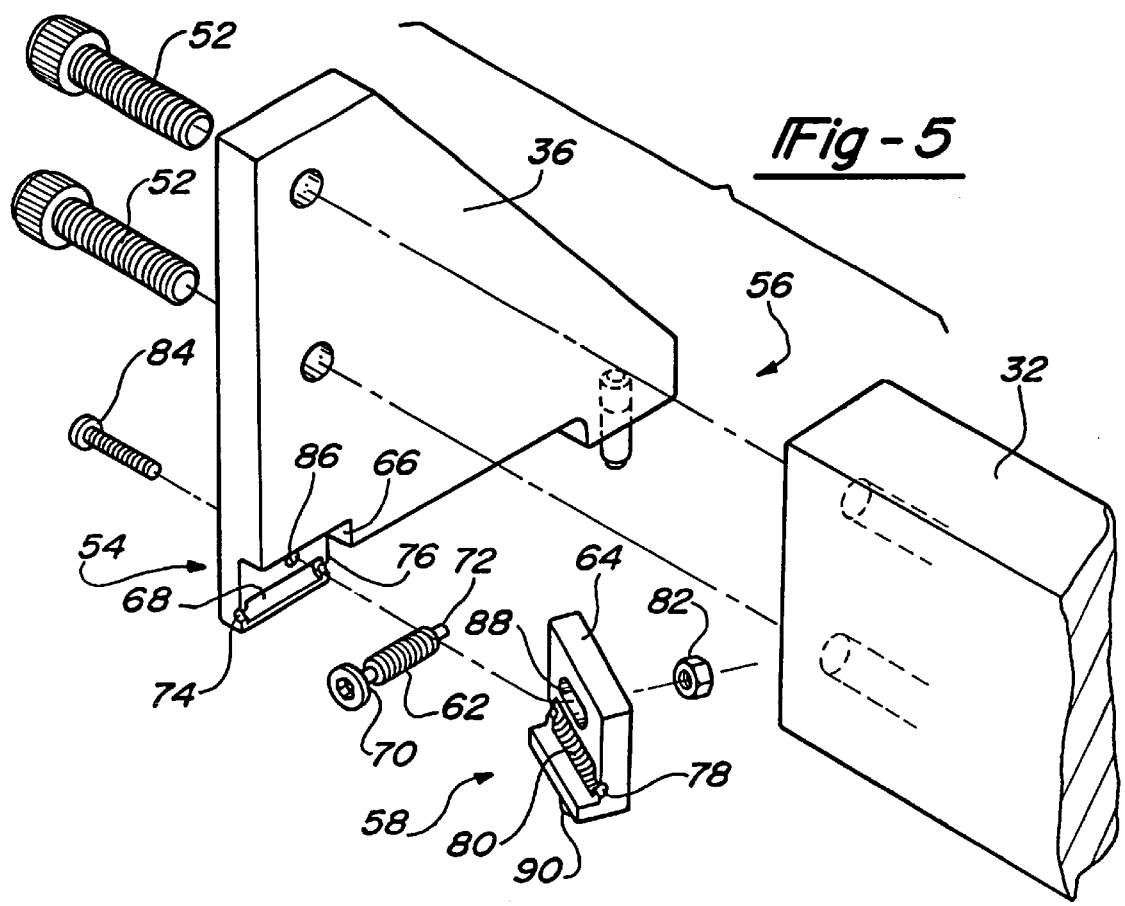
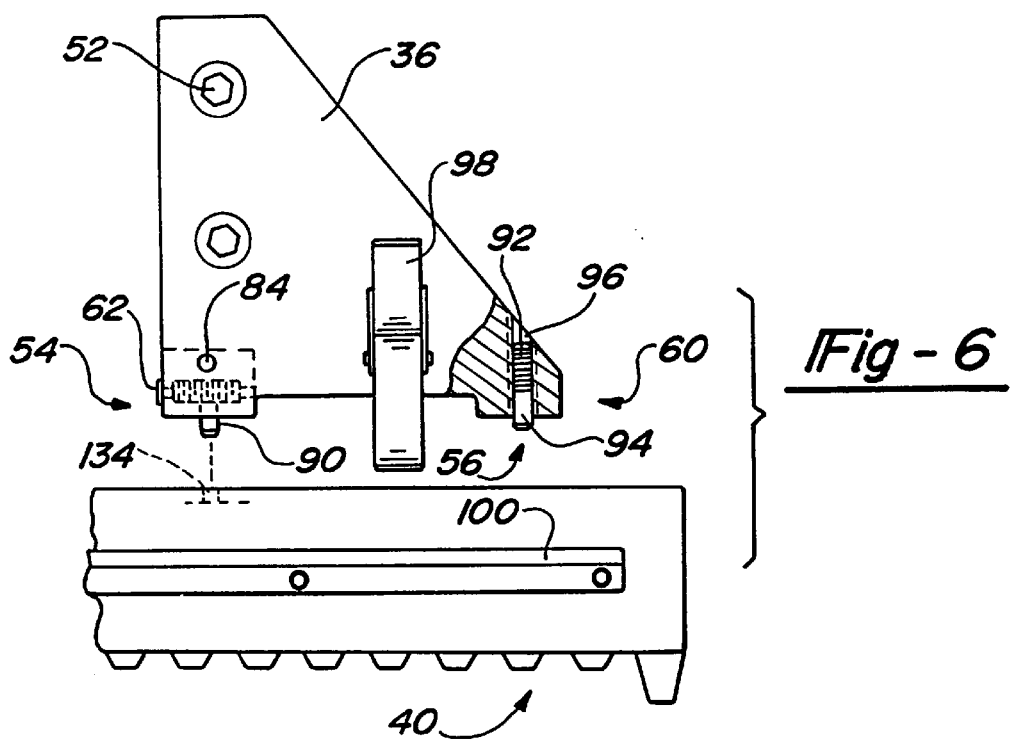

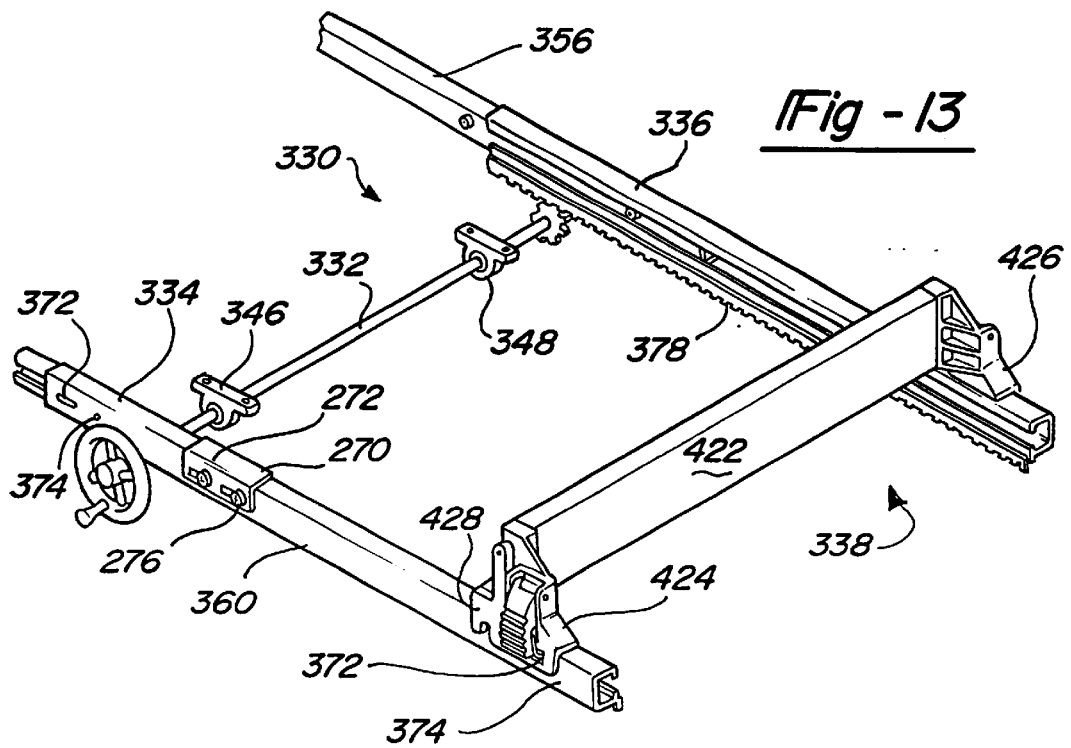
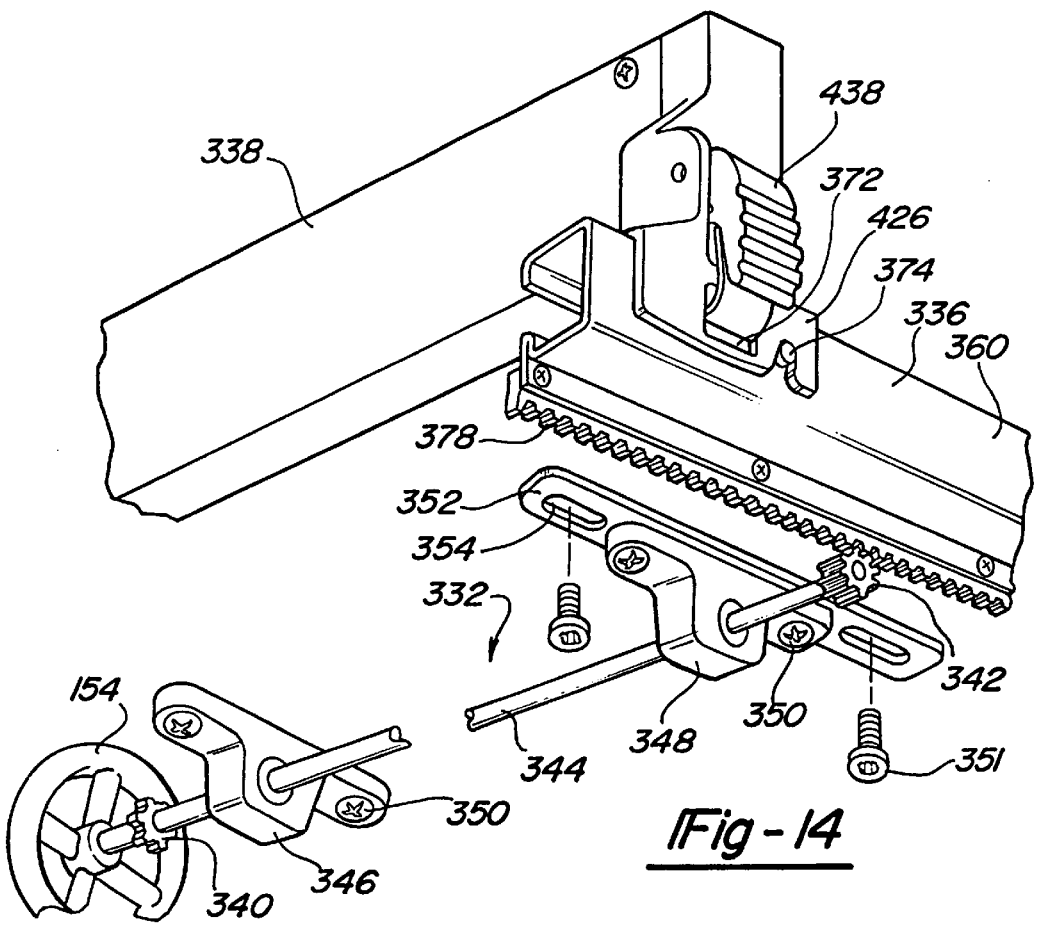

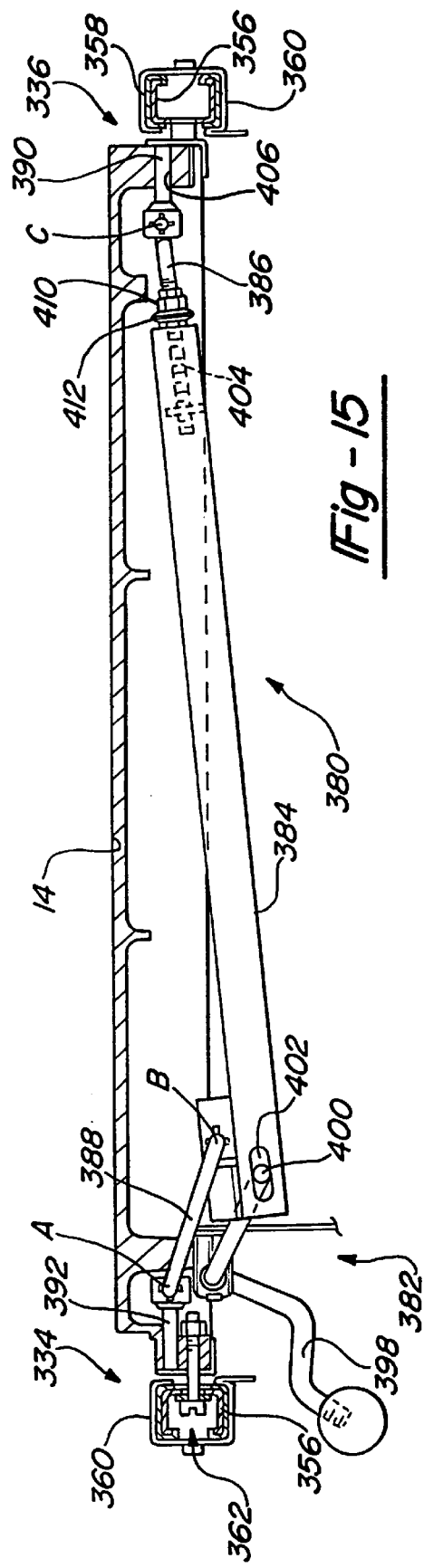
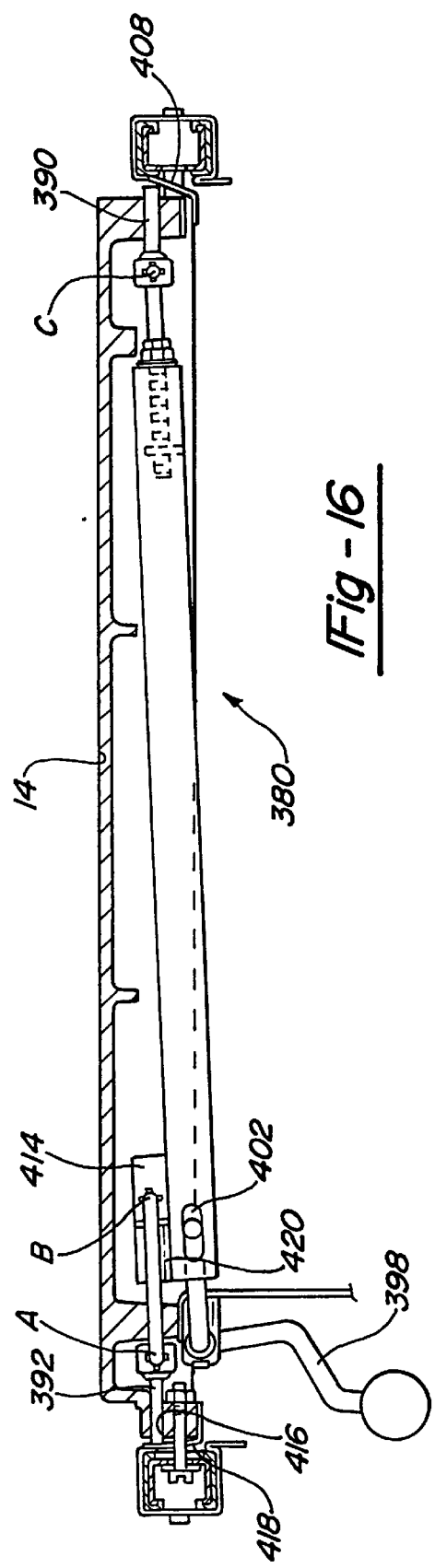
Fig-15
Fig-16

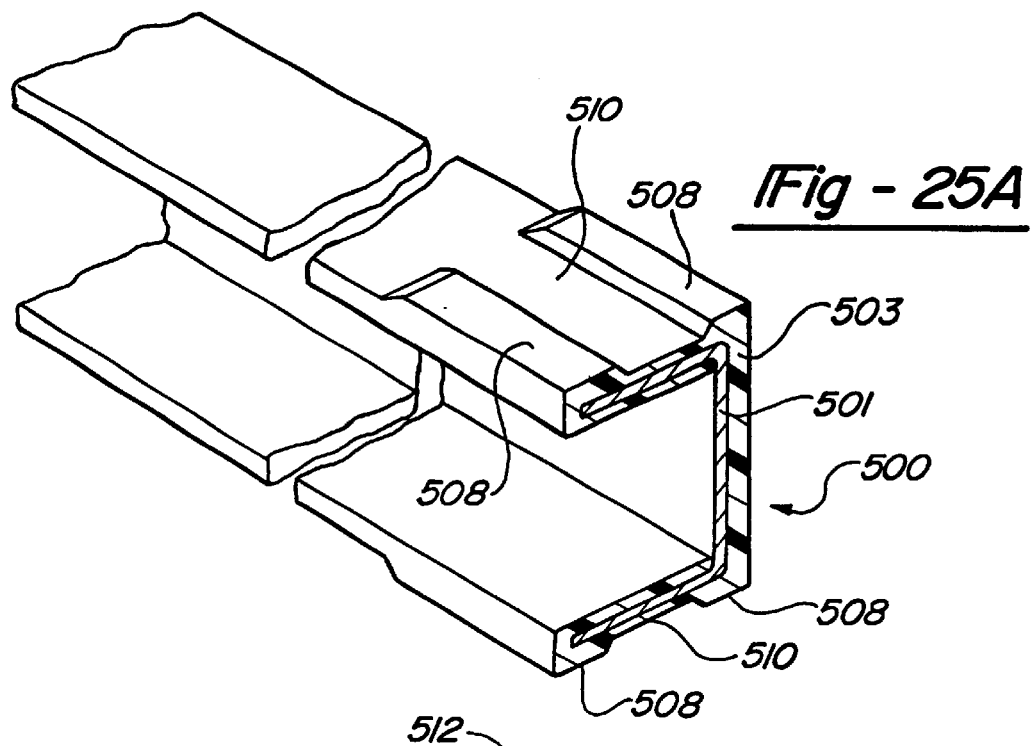
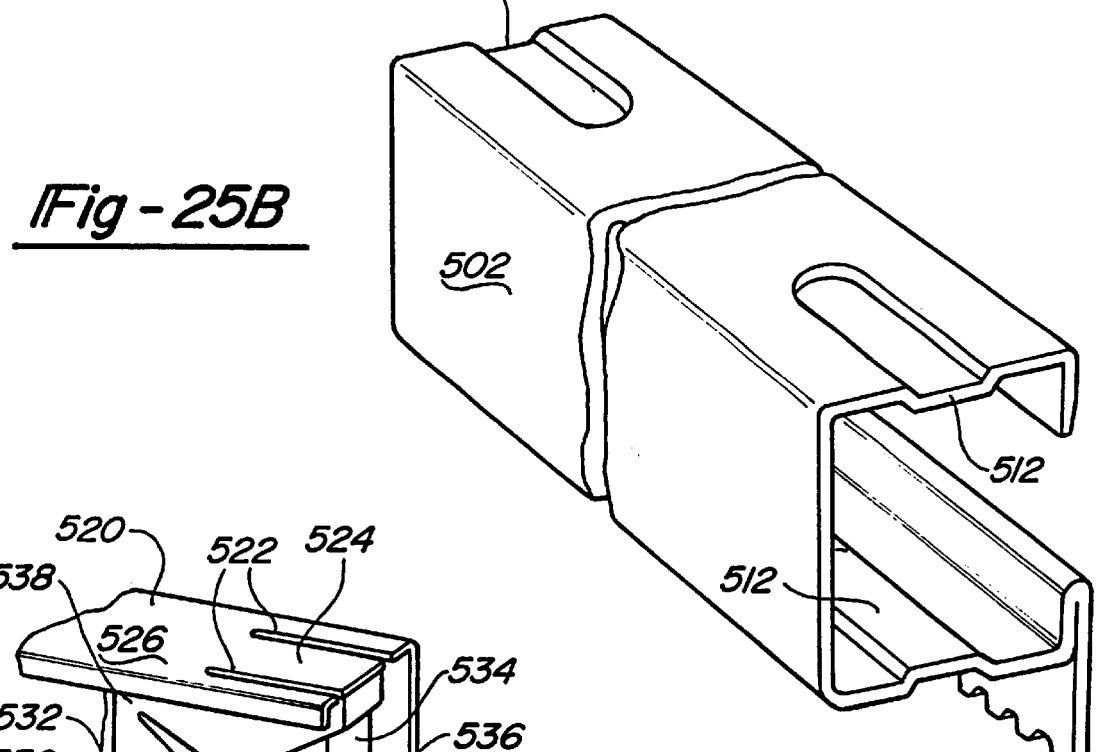
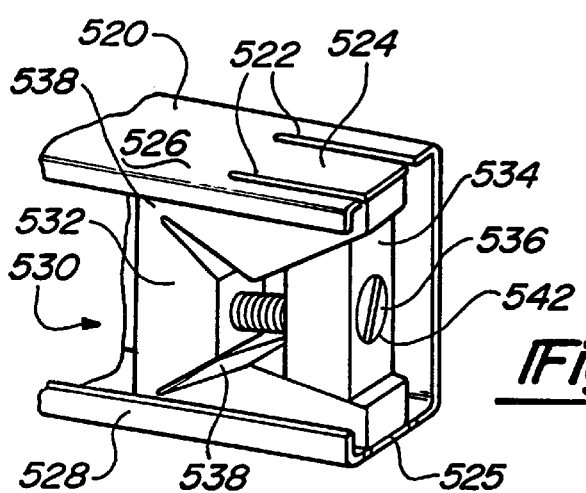

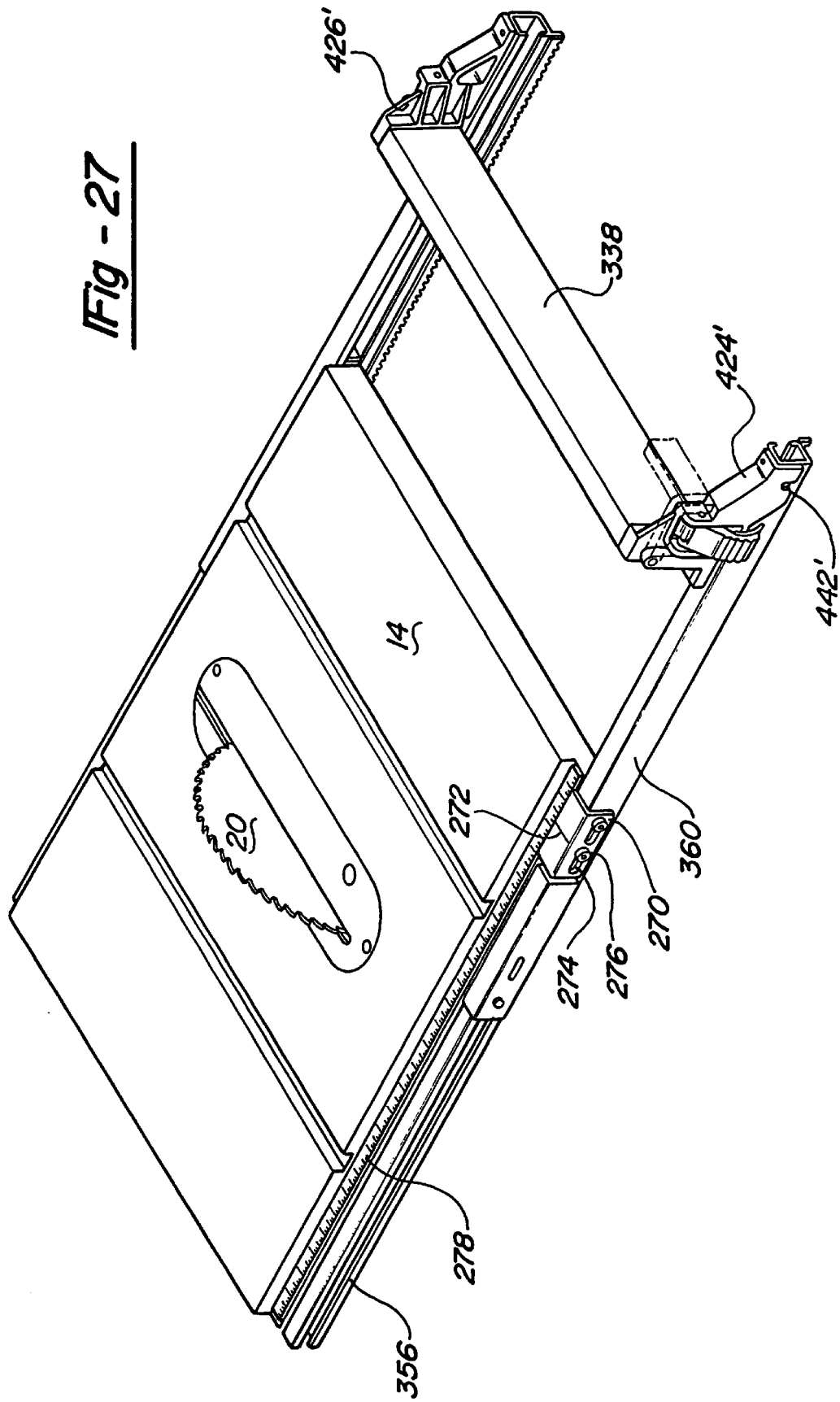

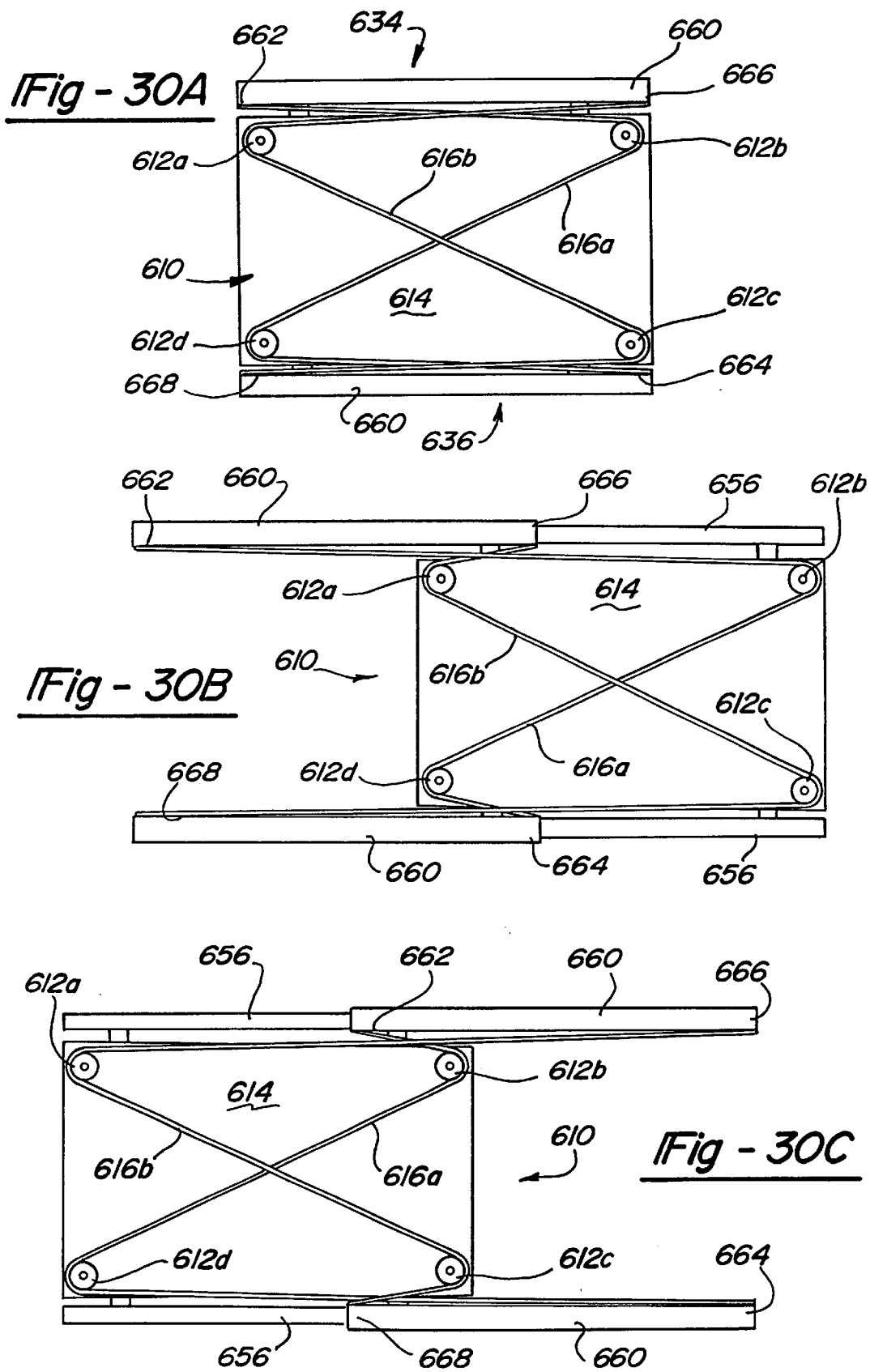

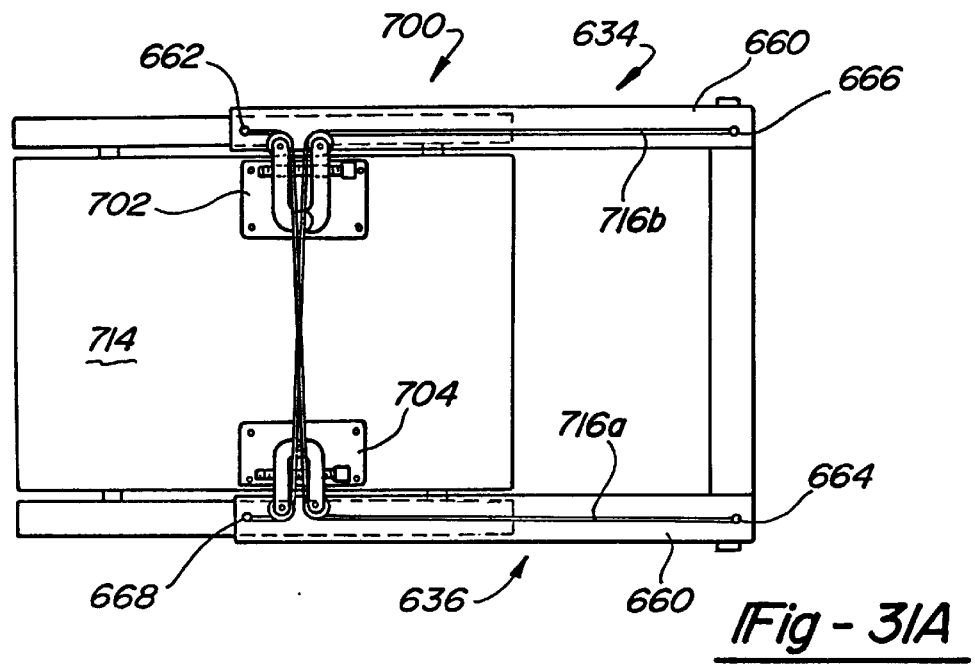
Fig-31A
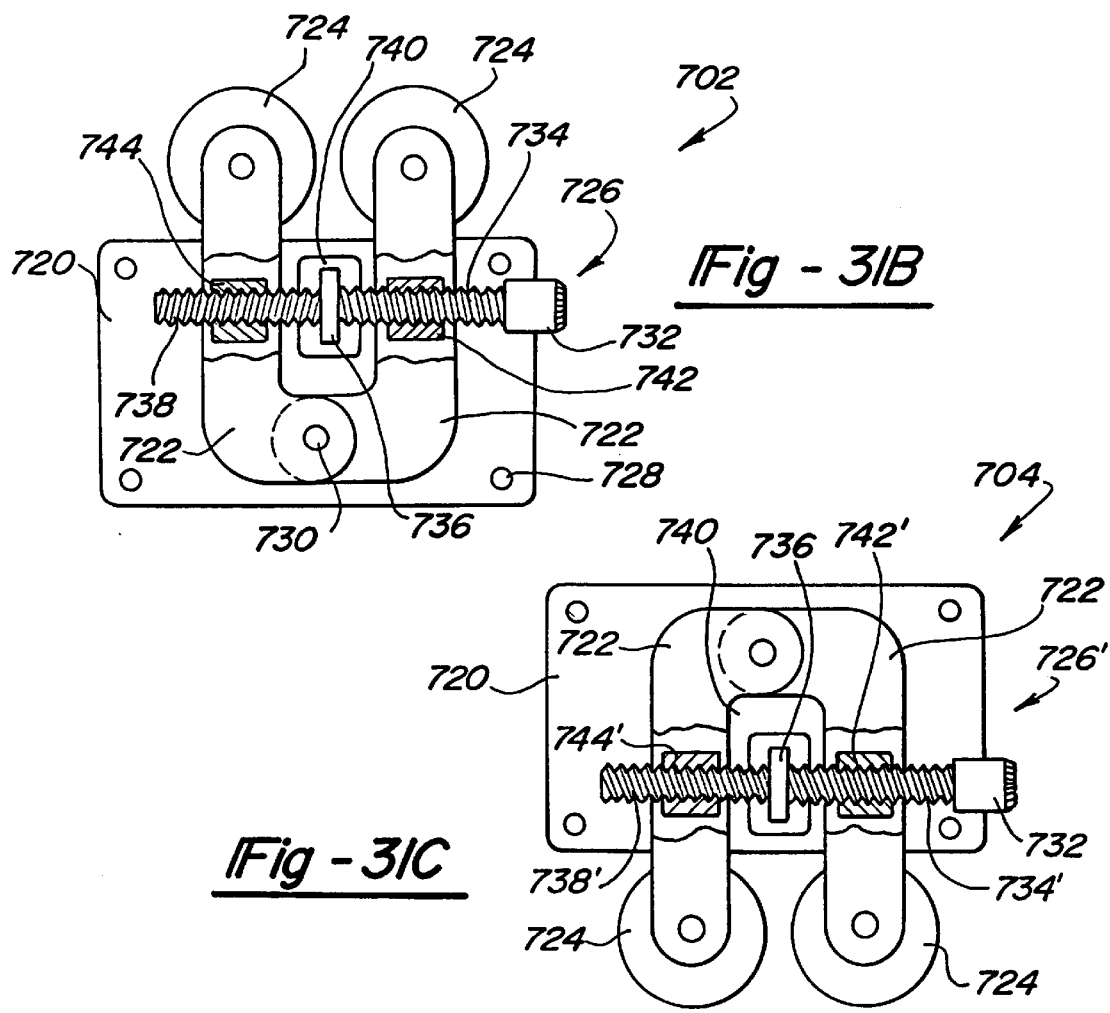
Fig-31B
Fig-31C

MOVABLE FENCE FOR A MACHINE TOOL

This is a division of U.S. patent application Ser. No. 08/883,749, filed Jun. 27, 1997, now U.S. Pat. No. 5,927,857, which is a continuation of 08/541,389 filed Oct. 10, 1995, now U.S. Pat. No. 5,722,308.

FIELD OF THE INVENTION

The present invention relates to work guiding systems for machine tools. More particularly, the present invention relates to a movable rip-fence for a table saw, band saw or the like which maintains a parallel relationship with the cutting blade during movement and/or adjustment of the position of the movable rip-fence.

BACKGROUND OF THE INVENTION

A typical table saw includes a base which supports a generally flat table top having a longitudinally extending slot and a pair of side rails extending along opposite sides of the table top generally perpendicular to the slot. The side rails are utilized for mounting a rip fence assembly to assist in positioning an article to be cut in relation to a cutting tool. A motor is mounted beneath the table top and the cutting tool, which may be a circular saw blade, is mounted for rotation with the output shaft of the motor. The cutting tool is positioned to project upwardly through the slot and is rotated by the motor in a plane which is generally perpendicular to the axis of the side rails. Cutting of the workpiece is normally accomplished by moving the workpiece longitudinally through the saw blade as it is rotating.

Table saws are used for cross cutting (transverse cutting to the length of the workpiece), bevel cutting (at an angle to the length of the workpiece) and rip cutting (longitudinal cutting along the length of the workpiece). For cross cutting and bevel cutting, an angularly and laterally adjustable fixture or fence is used which positions the workpiece perpendicular to or at the desired angle relative to the saw blade. For rip cutting, the separate rip fence assembly mounted on the side rails must be used in order to position the workpiece in the desired location which is generally parallel to the saw blade in order to perform the longitudinal or rip cutting operation on the workpiece.

The rip fence assembly helps in making the parallel rip cuts by guiding the workpiece longitudinally through the cutting tool while one edge of the workpiece is maintained in abutting relationship with the rip fence assembly. The rip fence assembly normally includes an elongated rip fence which extends between the two side rails of the base of the table saw. The elongated rip fence is generally perpendicular to the side rails and thus parallel to the cutting tool and/or cutting direction. The rip fence assembly typically includes a pair of fence guides secured at opposite ends of the rip fence, each of which is adapted to engage a respective side rail for sliding movement therealong.

During the movement and subsequent securing of the rip fence assembly along the side rails, it is necessary to keep the rip fence parallel to the plane of the saw blade in order to ensure the straightness of the cut and to avoid oblique angles between the said blade and the direction of cut. Even minor variations in such parallelism can lead to an unacceptable degree of error in the cutting of material to be used for various applications and the possibility of binding the cutting tool within the kerf being cut into the material. The problem of maintaining parallelism is magnified if one attempts to remove the rip fence assembly, for example to cut a large piece of stock such as a sheet of plywood or a fiberboard sheet, and then replace the rip fence assembly to resume the cutting of smaller pieces.

Prior art rip fence assemblies have worked well in securing the rip fence assembly to the side rails in order to position a workpiece relative to the cutting tool, while also permitting the rip fence assembly to be properly and accurately adjusted relative to the cutting tool for accurate longitudinal or rip cutting. Most of the problems that have arisen in connection with the prior art rip fence assemblies relate to adjusting the rip fence while simultaneously maintaining the rip fence in a parallel relationship to the cutting tool. In addition to the problems of parallelism, the rip fence assembly must be conveniently and quickly removed and subsequently reinstalled while still maintaining its relative positional relationship with the cutting tool. Some prior art systems do provide for the removal and replacement of the fence, but suffer a loss of parallelism in the process. Other prior art systems maintain parallelism of the fence but are difficult to remove and re-install.

Another problem associated with prior art rip fence assemblies and machine tools has been the width of permissible cut. When a machine tool or table saw is permanently located, it is a simple matter to provide extensions to the table top which have side rails which mate with the side rails of the machine tool or table saw to permit the adjustment of the rip fence assembly to allow virtually an unlimited width of permissible cut. When using a portable machine tool or table saw, the incorporation of table top extensions with the required accuracy of positioning the extensions, makes it unrealistic to continuously assemble and disassemble the various extensions as the machine tool or table saw is carried from one job site to another. Thus, a portable machine tool or table saw has the additional problem of adjusting the rip fence assembly to a position which allows for a maximum width of cut without the need for incorporating table top extensions or the like.

The continued development of rip fence assemblies is directed towards a highly accurate rip fence assembly which may be quickly and accurately secured in any desired position on the work table of a machine tool or table saw. The rip fence assembly should be capable of accurate positioning relative to the cutting blade as well as having a sufficient adjustment in the width of the cut to permit a wide cutting width without the need for incorporating table top extensions. The improved rip fence assembly should be relatively inexpensive to manufacture, simple and compact in construction and be suitable for use on machine tools or table saws adapted for both stationary and portable use in either a commercial or a home workshop environment.

SUMMARY OF THE INVENTION

The present invention provides the art with an adjustable rip fence assembly which maintains its positional relationship with the cutting tool during the adjustment of the width of cut. The width of cut is adjustable beyond the width of the table top without the need for extensions being added to the table top. The rip fence assembly comprises a rip fence which is adjustably secured to a front and rear rail assembly utilizing a front and a rear bracket. The front and rear rail assembly comprise a telescoping rail which is movable utilizing a rack and pinion assembly or a cable and a pulley system. In the rack and pinion assembly, each rail is provided with a rack which matingly engages a pinion. Both the front and rear pinions are secured for rotation on a common axle shaft such that rotation of the axle shaft translates into longitudinal parallel movement of the rip fence. The rip fence is first adjusted to be both plumb and parallel to the cutting tool utilizing the adjustable connections between the front and rear brackets and the respective rail assemblies. Once properly positioned, the rip fence can be adjusted to set the desired width of cut while still maintaining its positional relationship to the cutting tool due to the simultaneous movement of the front and rear racks by the common axle shaft and the front and rear pinion gears. In the cable and pulley system, opposite ends of opposing telescoping rails are connected to each other with the cable being routed through a series of pulleys such that the rip fence will maintain its positional relationship to the cutting tool due to the simultaneous movement of the telescoping rails caused by the cables and pulleys. The telescoping feature of the front and rear rail assemblies permit the width of cut to significantly exceed the width of the table top. When the rip fence assembly is positioned off of the work table, a pivotable work support is positioned adjacent to the rip fence to provide a supporting surface which is co-planar with the table top.

The present invention allows the fence assembly to be moved over a range of lengths which exceeds the length of the stationary rails. The fence assembly may be positioned outwardly of at least one side edge of the work table without requiring that the stationary rails extend outwardly of this side edge. Preferably, the fence assembly can be moved beyond the width of the work table, outwardly of either side edge, without requiring that the stationary rails have a length which is greater than the width of the table to provide for such movement. Further, the fence may be connected to both front and rear movable rails which telescopically engage and slide over front and rear stationary rails. The front and rear movable rails are interconnected, for example, by a rack and pinion mechanism or a system of cables and pulleys, which ensure that movement of one movable rail causes an equal movement of the other movable rail. Thus, the fence may be maintained parallel to the saw blade as it is moved relative thereto.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a plan view, partially in cross section, of the table saw and the rack and pinion fence assembly illustrated in FIG. 1;

FIG. 4 is a side elevational view of the table saw and the rack and pinion fence assembly illustrated in FIG. 1;

FIG. 5 is a blown apart perspective view illustrating the sliding pin mount on the proximate foot of the fence mounts in accordance with the present invention;

FIG. 6 is a side elevational view, partially in cross section, of the sliding pin mount on the distal foot of the fence mounts of the present invention;

FIG. 9 is a side elevational view, partially in cross section, of the telescoping rail of the present invention showing the attachment of the inner rails and the pinion shaft to the table saw;

FIG. 13 is a perspective view similar to FIG. 2 but showing another embodiment of a telescoping rack and pinion assembly according to the present invention;

FIG. 14 is a perspective view showing the adjustability of the rack and pinion assembly shown in FIG. 13;

FIG. 15 is a side elevational view partially in cross-section illustrating the locking mechanism for the rack and pinion assembly shown in FIG. 13 with the mechanism in the unlocked position;

FIG. 16 is a side elevational view partially in cross-section similar to FIG. 15 but with the locking mechanism shown in the locked position;

FIGS. 25A and 25B are enlarged perspective views illustrating the shims schematically shown in FIGS. 24A and 24B;

FIG. 26 is a partial perspective view of the stationary rail according to the present invention incorporating a wedge to provide an adjustable shim;

FIG. 27 is a perspective view showing the telescoping rack and pinion assembly of FIG. 13 and also sharing a further embodiment of a cutting width indicating mechanism;

FIGS. 30A–30C illustrate a telescoping rail assembly according to the present invention incorporating cables and pulleys for ensuring simultaneous movement of the two movable rails;

FIG. 31A illustrates a cable and pulley telescoping rail assembly according to another embodiment of the present invention;

FIG. 31B is an enlarged view of the tension adjustment pulley assembly shown in FIG. 31A;

FIG. 31C is an enlarged view of the alignment adjustment pulley assembly shown in FIG. 31A.

DETAILED DESCRIPTION OF THE PREFERRED EMBODIMENT

Figure 1:
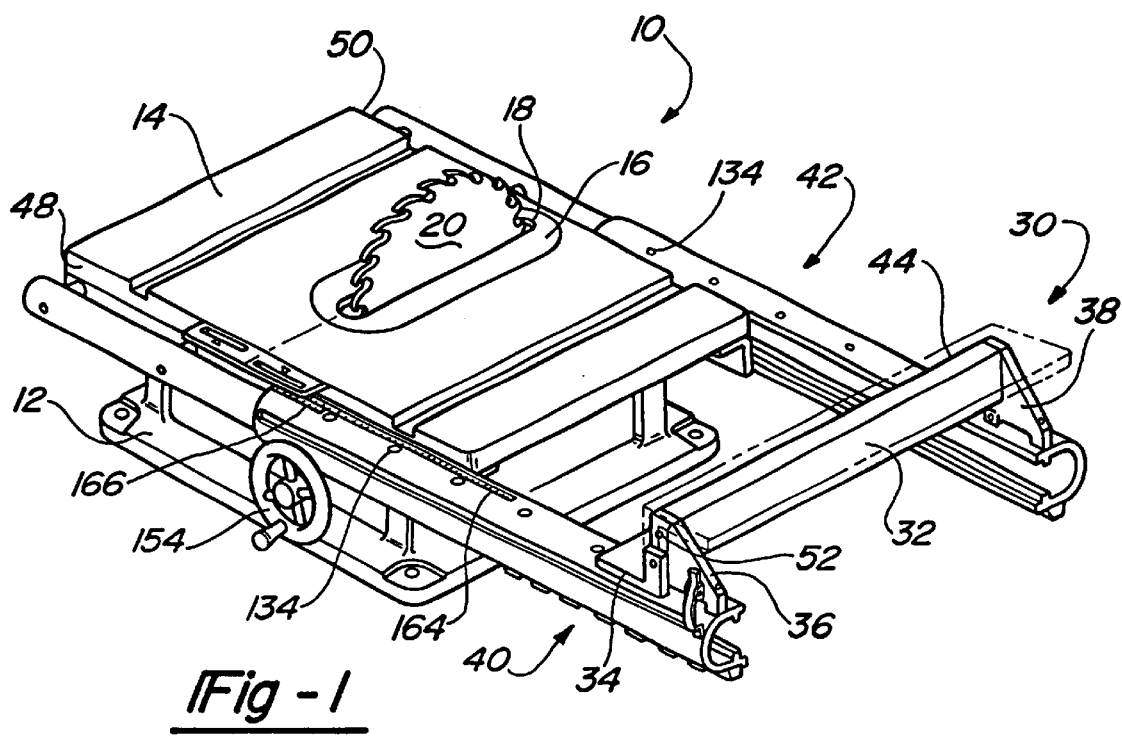
FIG. 1 is a perspective view of a table saw incorporating a unique rack and pinion fence assembly according to the present invention.
Figure 2:
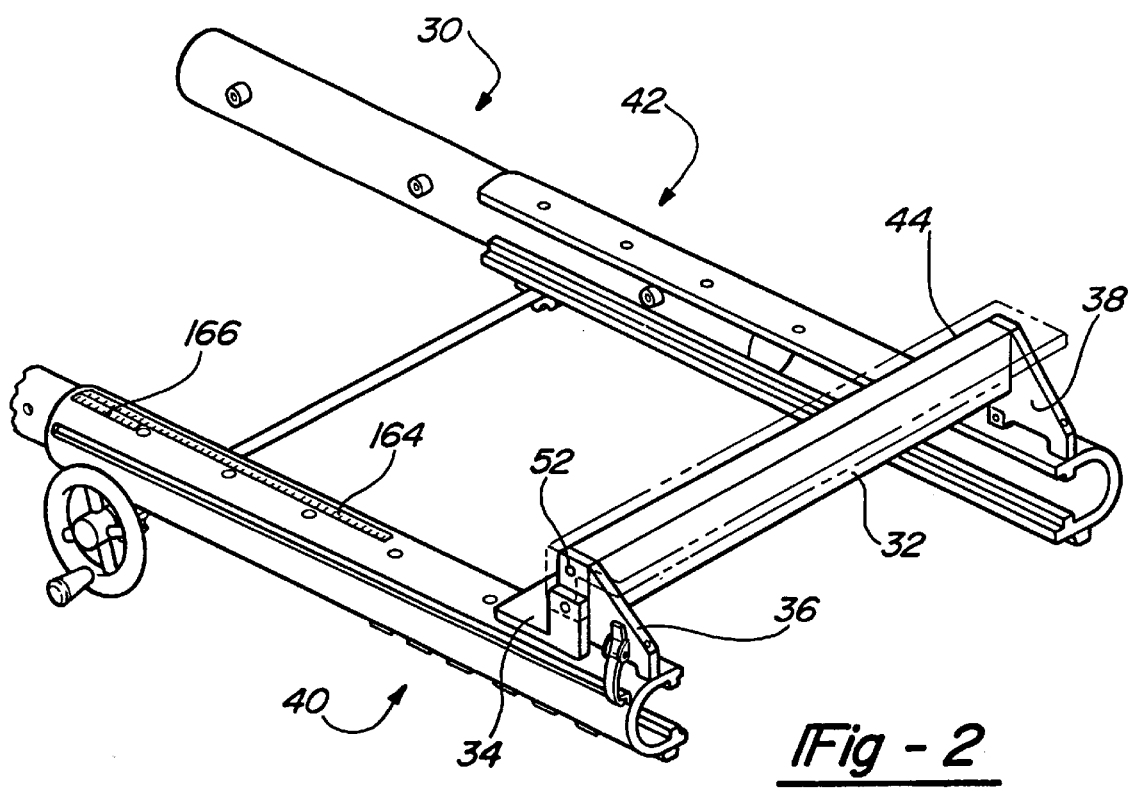
FIG. 2 is a perspective view of the telescoping rack and pinion fence assembly illustrated in FIG. 1.

Referring now to the drawings in which like reference numerals designate like or corresponding parts throughout the several views, there is shown in FIG. 1 a table saw which is designated generally by the reference numeral 10 incorporating a unique rack and pinion fence assembly according to one embodiment of the present invention. While the rack and pinion fence assembly of the present invention is being illustrated for exemplary purposes as being used in conjunction with table saw 10, it is within the scope of the present invention to incorporate the rack and pinion fence assembly of the present invention into any type of machine tool which utilizes a fence. For example, the invention could be utilized with a band saw, a scroll saw, drill press, drum sander or router table.

Referring to FIGS. 1 through 4 table saw 10 comprises a base 12 which supports a generally rectangular work table 14. Work table 14 includes an insert 16 which includes an elongated slot 18 through which a rotary cutting tool such as a circular saw blade 20 protrudes. Saw blade 20 is normally capable of being adjusted for depth of cut and angularity with respect to work table 14 by a control knob (not shown) and a control lever (not shown), respectively. Table saw 10 illustrated In FIGS. 1, 3 and 4 is a portable table saw which is easily movable from one job site to another. Table saw 10 can easily be picked up and carried utilizing work table 14 as the supporting locations when it becomes necessary to lift and carry table saw 10 from one job site to another.

One embodiment of the present invention is directed towards a unique rack and pinion fence assembly 30 which is deployable beyond the envelope of work table 14 in order to provide additional width for the cutting operation but yet maintaining a compact envelope for simplifying transportation of table saw 10. The compact envelope of table saw 10 facilitates both storage of table saw 10 and the movement of table saw 10 from one job site to another.

Rack and pinion fence assembly 30 comprises an elongated fence body 32, a pivotable support member 34, a front fence mount 36, a rear fence mount 38 and a pair of telescoping tubular side rail assemblies 40 and 42. Fence body 32 is an elongated generally rectangular member which provides a flat guide surface 44. Fence body 32 is sized to extend beyond both a front and a rear longitudinal edge 48 and 50, respectively, of work table 14. Referring now to FIG. 5, fence body 32 is fixedly secured at its opposite ends to front fence mount 36 and rear fence mount 38 using a plurality of bolts 52. Pivotable support member 34 is pivotably secured to both front and rear fence mounts 36 and 38 and extends between mounts 36 and 38 as shown in FIGS. 1 through 4. When fence body 32 is adjusted to provide a relatively wide cut, fence body 32 extends beyond the surface of work table 14 as shown in FIGS. 1, 3 and 4. In this situation, conventional table saws do not provide support for the workpiece at a point directly adjacent to fence body 32. The only support for the workpiece would be the surface of work table 14 which can be a substantial distance from fence body 32. In table saw 10, pivotable support member 34 provides a surface for supporting the workpiece adjacent to fence body 32 when support member 34 is positioned in its lower position as shown in FIGS. 1 through 4. The supporting surface of pivotable support member 34 is designed to be co-planar with the top surface of work table 14 when support member 34 is in its lowered position. When fence body 32 is adjusted to provide a relatively narrow cut, fence body 32 will be positioned over the surface of work table 14 and there is no need for pivotable support 34 as the workpiece will be supported by the surface of work table 14 directly adjacent to fence body 32. In this narrower cutting application, pivotable support 34 is moved to its upper position, shown in phantom in FIGS. 1, 2 and 4, and fence body 32 functions with work table 14 in a normal manner.

Figure 7A:
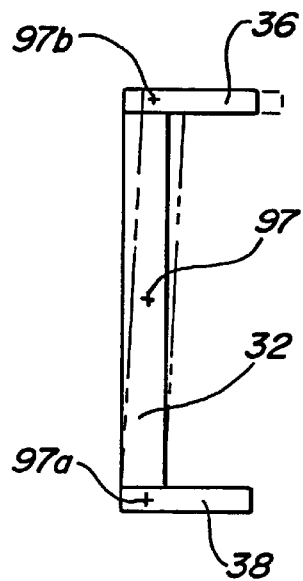
FIG. 7A is a top plan schematic view showing the adjustability of the sliding pin mount shown in FIG. 5.

Referring now to FIGS. 5 and 6, front and rear fence mounts 36 and 38 are adapted to adjustably secure fence body 32 to the pair of telescoping tubular side rail assemblies 40 and 42. FIGS. 5 and 6 illustrate only front fence mount 36. Front fence mount 36 and rear fence mount 38 are identical except for being mirror images of each other. It is to be understood that rear fence mount 38 incorporates the same adjustment features that are provided in front fence mount 36. Front fence mount 36 and rear fence mount 38 are each a plate-like member defining a proximate foot 54 which is adjacent fence body 32 and a distal foot 56 which is distal of fence body 32. The adjustable mounting of front and rear fence mounts 36 and 38 provides adjustment for the plumbness of fence body 32 as well as adjustment for the parallelism of fence body 32 relative to saw blade 20. The adjustment for the parallelism of fence body 32 ensures that it will be parallel in the horizontal plane to the plane of saw blade 20, as shown in FIG. 7A, and is accomplished using an adjustment mechanism 58 on proximate foot 54. The adjustment for the plumbness of fence body 32 ensures that it will be parallel to the plane of saw blade 20 in a vertical plane, shown in FIG. 7B, and is accomplished using an adjustment mechanism 60 on distal foot 56.

Referring now to FIG. 5, adjustment mechanism 58, on proximate foot 54, comprises a bolt 62 and a pin mount 64. Proximate foot 54 defines a notch 66 which extends upward from the bottom of proximate foot 54. Extending into the portion of proximate foot 54 defined by notch 66 is a cavity 68 having a semi-circular cross-section within which bolt 62 is located. Bolt 62 includes a front annular groove 70 and a rear annular groove 72 which mate with a front and rear annular shoulder 74 and 76, respectively, located at opposite ends of cavity 68. Thus, bolt 62 is trapped within cavity 68 by the engagement of grooves 70 and 72 with shoulders 74 and 76, but bolt 62 is free to rotate within cavity 68 due to the lack of screw threads on the internal surface of cavity 68. Pin mount 64 is a generally L-shaped member which is disposed within notch 66. Pin mount 64 includes a cavity 78 having a semi-circular cross-section which defines a plurality of threads 80 which threadingly engage bolt 62. Pin mount 64 is secured to proximate foot 54 by a nut 82 and bolt 84 which extend through a hole 86 in proximate foot 54 and a corresponding slot 88 extending through sliding pin mount 64. A mounting pin 90 extends vertically from the bottom surface of mount 64 and is designed to engage any one of a plurality of corresponding apertures 134 located within front or rear telescoping side rail assembly 40 and 42. Once assembled, rotation of bolt 62 forces relative longitudinal movement of front fence mount 36 along pin mount 64 due to the fact that mounting pin 90 is disposed within the corresponding aperture 134, and that bolt 62 is trapped within cavity 68 and engaged with the plurality of threads 80 located in cavity 78 of pin mount 64. Thus, fence mount 36 undergoes longitudinal movement along rail assembly 40 or 42 while fence mount 38 remains stationary. This longitudinal movement of fence mount 36 relative to fence mount 38 will adjust the parallelism of fence body 32 with respect to saw blade 20 by causing rotation of fence body 32 about a vertical axis as shown in FIG. 7A.

Figure 7B:
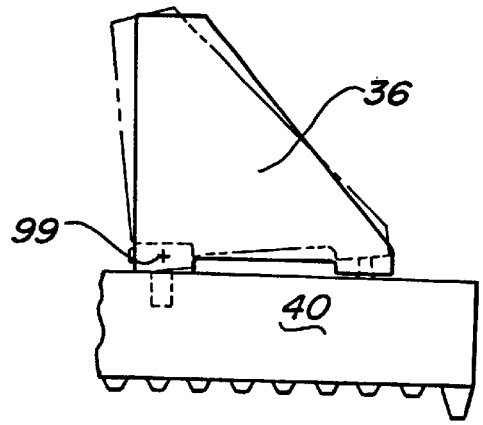
FIG. 7B Is a side elevation schematic view showing the adjustability of the sliding pin mount shown in FIG. 6.
Figure 8:
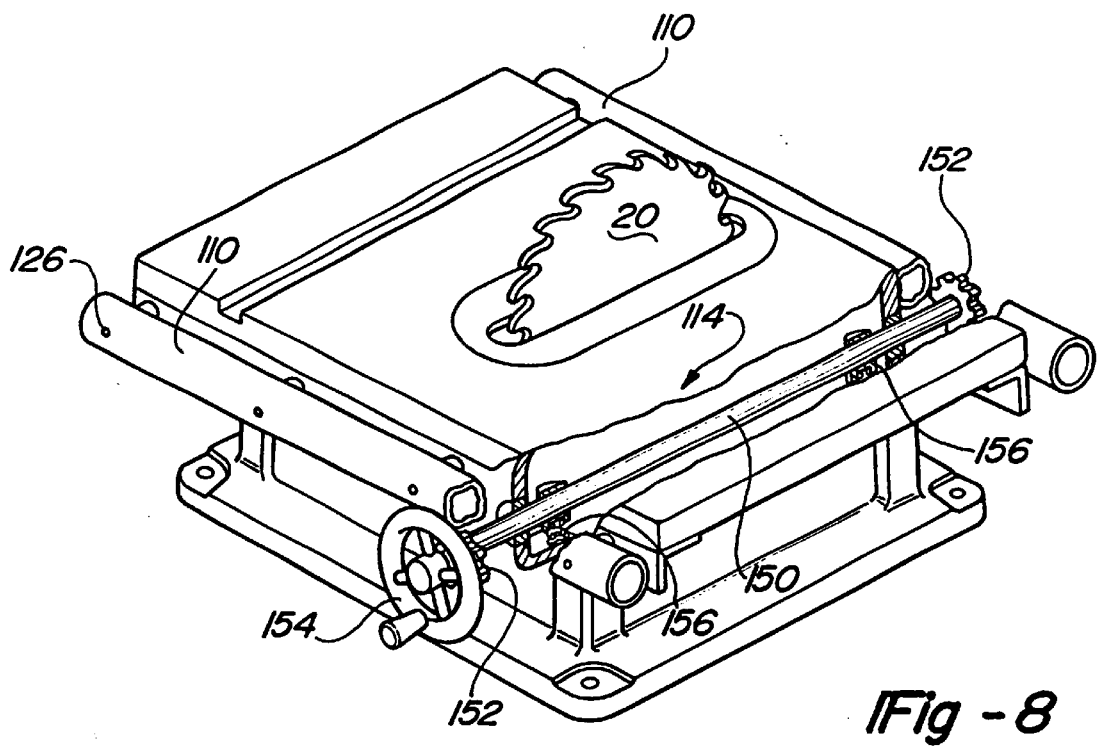
FIG. 8 is a perspective view, partially in cross section, of the table saw with only the fixed inner rails and the pinion shaft assembly being secured to the work table.

Referring now to FIG. 6, adjustment mechanism 60 on distal foot 56 comprises a set screw 92 and a mounting pin 94. Distal foot 56 defines a threaded bore 96 which extends completely through distal foot 56. Set screw 92 is threadingly received within bore 96 and mounting pin 94 is slidingly received within bore 96 and extends vertically through the lower surface of distal foot 56 to support front fence mount 36 or rear fence mount 38 on front or rear telescoping side rail assemblies 40 or 42. Set screw 92 may be accessed by a screwdriver or a wrench from the upper opening of base 96. The rotation of set screw 92 in one direction will increase the vertical distance that mounting pin 94 extends downwardly from distal foot 56 and rotation of set screw 92 in the opposite direction will decrease the vertical distance that mounting pin 94 extends downwardly from distal foot 56. The vertical movement of mounting pin 94 with respect to distal foot 56 will adjust the plumbness of fence body 32 with respect to saw blade 20 as shown in FIG. 7B. Mounting pin 94 is maintained within bore 96 due to the sliding relationship between pin 94 and bore 96 or, H desired, pin 94 may be manufactured as an integral part of set screw 92.

The adjustment of fence body 32 and front and rear fence mounts 36 and 38 begin by locating mounting pin 90 of front fence mount 36 in any one of the corresponding apertures 134 located within front or rear telescoping side rail assemblies 40 or 42. Mounting pin 90 of rear fence mount 38 is also located in any one of the corresponding apertures 134 located on the opposite telescoping side rail assembly 40 or 42. The orientation of fence body 32 and front and rear fence mounts 36 and 38 will be determined by the side of saw blade 20 upon which fence body 32 is to be located. Once positioned on side rail assemblies 40 and 42, fence body 32 is supported by front and rear fence mounts 36 and 38 which are positioned on side rail assemblies 40 and 42 by proximate feet 54 and the pair of mounting pins 94 extending out of rear feet 56.

The parallelism of fence body 32 with respect to saw blade 20 may be determined by moving fence body 32 to a position adjacent to the saw blade itself or adjacent to a groove machined into work table 14, or by using a T-square or any other means to determine the parallelism of fence body 32 with respect to saw blade 20. The parallelism may be adjusted by rotating either or both bolts 62, causing the movement of fence mount 36 as discussed above. This movement will rotate fence body 32 about a vertical axis 97 if both bolts 62 are adjusted, or about a vertical axis 97a if only bolt 62 of front mount 36 is adjusted, or about a vertical axis 97b if only bolt 62 of rear mount 38 is adjusted as shown in FIG. 7A. Once the parallel position of fence body 32 has been adjusted, nuts 82 are tightened on bolts 84 on both front and rear fence mounts 36 and 38 to lock each sliding pin mount 64 within its respective notch 66. While the above description has defined both front and rear fence mounts 36 and 38 as having adjustment mechanism 58, it is within the scope of the present invention to only have one of front and rear fence mounts 36 and 38 equipped with adjustment mechanism 58 and the other mount being equipped with a fixed mounting pin 90. Equipping only one of fence mounts 36 and 38 with adjustment mechanism 58 would reduce the amount of adjustment due to the fact that only one slot 88 would be available for adjustment.

Once the parallelism of fence body 32 has been set, the plumbness can be adjusted using saw blade 20, a right-angle square or any other means of determining the plumbness of fence body 32. Adjustment of the plumbness of fence body 32 is accomplished by rotating the pair of set screws 92 to change the vertical extension of both mounting pins 94 extending from rear feet 56. This movement will rotate fence body 32 about a horizontal axis 99 as shown in FIG. 7B. Once the plumbness of fence body 32 has been adjusted, the position of set screws 92 within threaded bore 96 can be maintained by providing locking nuts or screws or by any other means known well in the art.

Upon the completion of both the parallelism and plumbness adjustments of fence body 32, an over-center latch 98 secures fence body 32 and front and rear fence mounts 36 and 38 in position on front and rear side rail assemblies 40 and 42 by engaging a keeper 100 fixedly secured to front and rear side rail assemblies 40 and 42. Over-center latch 98 is well known in the art and will not be discussed further within this specification.

Referring now to FIGS. 2, 3, 8 and 9, front and rear telescoping tubular side rail assemblies 40 and 42 are each comprised of an inner rail 110, and an outer rail 112. A pinion shaft assembly 114 extends between and engages side rail assemblies 40 and 42. Inner rails 110 are generally circular shaped tubular members having a specified length which, in the preferred embodiment, is generally equal to the width of work table 14. Inner rails 110 are fixedly secured to work table 14 using a plurality of fasteners 116 which are spaced along the entire length of inner rail 110. As shown in FIG. 9, fasteners 116 include a bolt 118, a nut 120 and a bushing 122. Bolt 118 extends through inner rail 110 and through a bracket 124 which is secured to or is an integral part of work table 14. Bushing 122 is preferably made from UHMW-PE material and is located between inner rail 110 and bracket 124 with the assembly being secured by nut 120 being threadingly received on bolt 118. Bushing 122 may extend over the entire length of inner rail 110. An access hole 126 for each bolt 118 extends through inner rail 110 to provide access to the respective bolt 118. Inner rail 110 of side rail assembly 40 is fixedly secured to the front of work table 14 generally parallel to front edge 48 of work table 14 while an identical inner rail 110 of side rail assembly 42 is fixedly secured in a similar manner to the rear of work table 14 generally parallel to rear edge 50. Both inner rails 110 extend along the entire width of work table 14 to provide the maximum amount of support for outer rail 112 while still maintaining a minimized envelope for table saw 10 for both storage and portability.

Outer rail 112 is a generally U-shaped tubular member which is slidingly received over inner rail 110. Outer rail 112 includes a pair of ribs 130 which are adapted to mate with each bushing 122 by being slidingly received within a groove 132 extending into each bushing 122. The external surface of each outer rail 112 is adapted to locate and secure front and rear fence mounts 36 and 38 relative to outer rail 112 using apertures 134. The plurality of apertures 134 extend through the upper surface of each outer rail 112 and are sized to freely receive mounting pin 90 of pin mount 64 of adjustment mechanism 58. The distance between any two apertures 134 is designed to be different than the distance between pins 90 and 94 of adjustment mechanism 58 and adjustment mechanism 60, respectively. Accordingly, when pin 90 is inserted in one of the apertures 134, the respective mounting pin 94 of adjustment mechanism 60 will always contact the upper surface of outer rail 112 and cannot be inserted into any of apertures 134. The plurality of apertures 134 are provided in order to allow the manual positioning of front and rear fence mounts 36 and 38 along the entire length of outer rail 112 on both the left and right sides of saw blade 20 to maximize the versatility of fence assembly 30. Outer rail 112 further includes keeper 100 secured to the outside surface of outer rail 112 and extending over the entire length of outer rail 112. Keeper 100 is adapted to mate with over-center latch 98 to secure front and rear fence mounts 36 and 38 to outer rail 112 once their final position has been determined. Once over-center latch 98 has been secured, further adjustment of fence mounts 36 and 38 is prohibited.

As shown in FIG. 9, outer rail 112 also includes a rack 140 which is fixedly secured to the bottom surface of outer rail 112 and extends over its entire length. Rack 140 has a trapezoidal shaped cross section which is slidingly received in a dove-tailed groove 142 located within outer rail 112. Once positioned within groove 142, a plurality of staked areas (not shown) are formed into outer rail 112 to secure rack 140 relative to outer rail 112. Rack 140 further includes a plurality of rack teeth 146 which extend over the entire exposed surface of the rack. Rack teeth 146 are designed to mate with pinion shaft assembly 114 as detailed below.

While rack 140 is being illustrated as a separate component secure to outer rail 112, it is within the scope of the present invention to have rack 140 integral with outer rail 112 if desired.

Referring now to FIGS. 1 through 4 and 9, pinion shaft assembly 114 comprises a pinion shaft 150, a pair of pinion gears 152 and an adjustment wheel 154. Pinion gears 152 and adjustment wheel 154 are fixedly secured to pinion shaft 150 for rotation therewith. Pinion shaft 150 is rotatably secured to base 12 such that pinion gears 152 are each engaged with rack teeth 146 on each outer rail 112 with adjustment wheel 154 extending beyond the front outer rail 112 for accessibility by an individual. Thus, rotation of adjustment wheel 154 causes rotation of pinion shaft 150 and pinion gears 152 which, due to their engagement with rack teeth 146 of rack 140, cause longitudinal movement of each outer rail 112 with respect to each inner rail 110 and the movement of fence body 32 relative to saw blade 20. Due to the fact that both front and rear pinion gears 152 rotate simultaneously and by the same amount due to their rotation with pinion shaft 150, both front and rear outer rails 112 will move together and the same distance due to the engagement of rack teeth 146 of each rack 140 with a respective pinion gear 152. The simultaneous and equal movement of each outer rail 112 will thus ensure that the relationship between fence body 32 and saw blade 20 will be maintained during the adjustment of the width of cut for table saw 10.

The rotatable mounting of pinion shaft 150 to base 12 permits both the rotation of pinion shaft 150 relative to base 12 and the vertical longitudinal movement of pinion shaft 150 with respect to base 12 in a direction which is generally perpendicular to the axis of outer rails 112 and racks 140. A pair of coil springs 156 are located between base 12 and pinion shaft 150 normally biasing pinion shaft 150 towards racks 140 and thus pinion gears 152 into biased engagement with rack teeth 146 of racks 140. This biasing of pinion shaft 150 towards racks 140 of outer rails 112 operates to improve the accuracy of the parallel adjustment of fence assembly 30 by removing any lash between the various components. The biasing of pinion shaft 150 will remove the lash between pinion gears 152 and racks 140 as well as the lash between outer rails 112 and Inner rails 110.

Figure 10A:
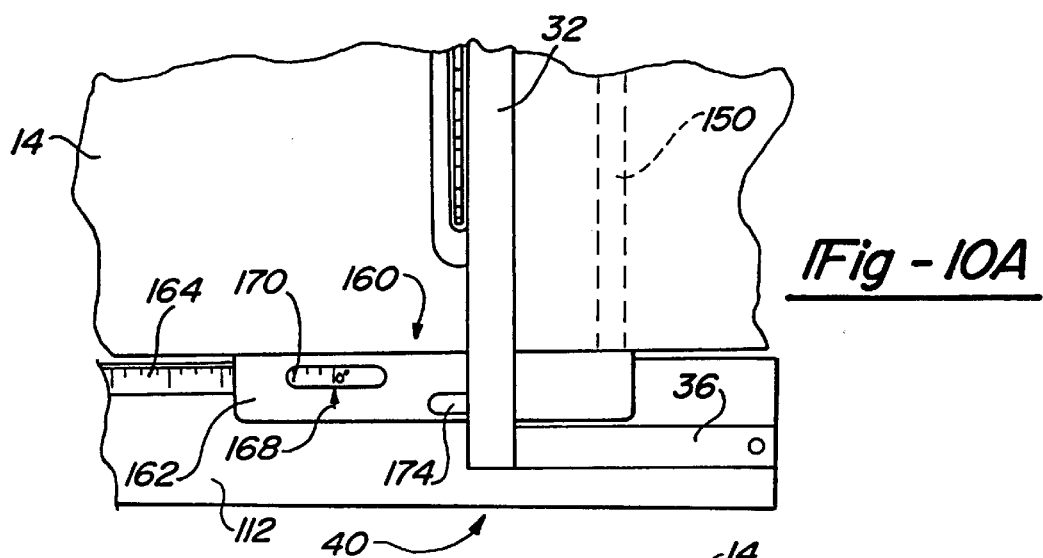
FIG. 10A is an enlarged schematic presentation of the cutting width indicating mechanism of the present invention shown at a 0" cutting width.
Figure 10B:
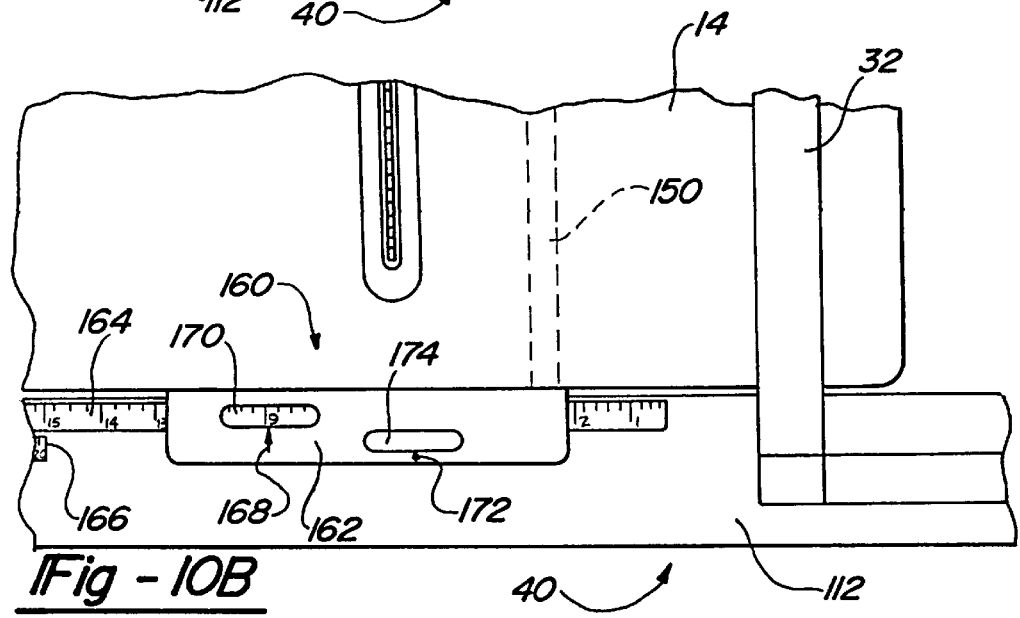
FIG. 10B is an enlarged schematic presentation of the cutting width indicating mechanism of the present invention shown at a 9" cutting width.
Figure 10C:
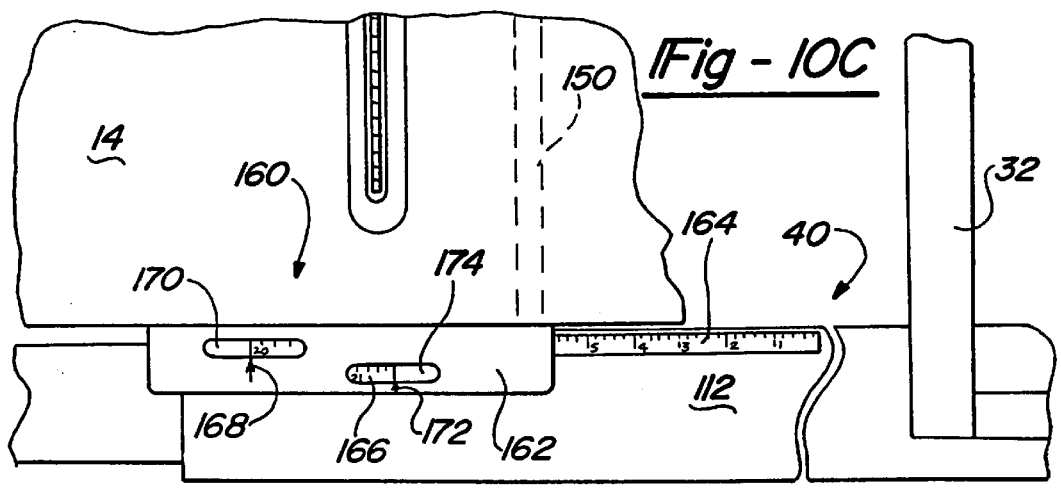
FIG. 10C is an enlarged schematic presentation of the cutting width indicating mechanism of the present invention shown at a 20" cutting width.

FIGS. 10A through 10C illustrate a width cut dimensional Indicator 160 which is incorporated into rack and pinion fence assembly 30 in order to provide an accurate reading for the distance between fence body 32 and saw blade 20 over the entire adjustment range of rack and pinion fence assembly 30. Indicator 160 comprises a stationary lens 162, a first scale 164 and a second scale 166. Stationary lens 162 is fixedly secured to work table 14 in such a position that it does not interfere with the movement of rack and pinion fence assembly 30. Stationary lens 162 is capable of being adjusted in order to Initially set the width indicator provided by indicator 160 by means described below. Stationary lens 162 Includes a primary pointer 168 positioned adjacent a first viewing aperture 170 and a secondary pointer 172 positioned adjacent a second viewing aperture 174. The positions of apertures 170 and 174 are offset as shown in FIGS. 10A through 10Cb in order to allow viewing scales 164 and 166 as will be described later herein. The distance between primary pointer 168 and secondary pointer 172 is a pre-specified distance. In one embodiment, this distance is five inches.

First scale 164 is fixedly secured to or is embossed into outer rail 112 of front tubular side rail assembly 40. First scale 164 is graduated into specified increments and extends along outer rail 112 a specified distance. In one embodiment, first scale 164 extends for twenty inches and is graduated into one-sixteenth inch increments. The position of first scale 164 on outer rail 112 is such that first scale 164 can be viewed through first viewing aperture 170 when first scale 164 is located beneath stationary lens 162.

Second scale 166 is fixedly secured to or is embossed into outer rail 112 of front tubular side rail assembly 40 adjacent to first scale 164. Second scale 166 is graduated into specified increments and extends along outer rail 112 a specified distance. In one embodiment, second scale 166 extends for five inches and is graduated into one-sixteenth inch increments. One embodiment sets the length of second scale 166 equal to the length between primary pointer 168 and secondary pointer 172 but is to be understood that the length of second scale 166 can be different than the pointer distance. This position of second scale 166 adjacent to first scale 164 on outer rail 112 is such that second scale 166 can be viewed through second viewing aperture 174.

FIG. 10A illustrates schematically the initial adjustment for indicator 160. First, fence body 32 of fence assembly 30 is positioned adjacent to saw blade 20. At this point, stationary lens 162 is adjusted to position primary pointer 168 over the "0" mark on the first scale 164 as viewed through aperture 170. Stationary lens 162 is then secured in this "zero" position. "This Zero" adjustment by the operator is required after each change of cutting tool or any time that indicator 160 is out of adjustment. Stationary lens 162 is preferably provided with one or more slots and corresponding attachment bolts to provide for the "zero" position adjustment. The adjustment is made by loosening the corresponding attachment bolts and moving stationary lens 162 longitudinally. Once positioned at the "zero" reading, the corresponding attachment bolts are again tightened to secure lens 162 in place. Alternatively, this "zero" position adjustment can be provided for by other means known well in the art. Any adjustment to the distance between fence body 32 and saw blade 20 by the movement of fence body 32 will be indicated by pointers 168 or 172 through apertures 170 and 174 respectively.

FIG. 10B illustrates schematically a setting where the distance between fence body 32 and saw blade 20 is nine inches. Rack and pinion fence assembly 30 is moved to the right of saw blade 20 until primary pointer 168 is positioned adjacent the nine inch marking on first scale 164 as viewed through aperture 170. At this point, fence body 32 is located nine inches from the edge of saw blade 20 and a rip cut is set which produces a nine inch wide piece of cut material.

Due to the fact that rack and pinion fence assembly 30 can position fence body 32 further from saw blade 20 than the prior art fence assemblies, second scale 166, secondary pointer 172 and second aperture 174 have been incorporated into indicator 160. FIG. 10C illustrates schematically, the crossover point between first scale 164 and second scale 166 which, in the preferred embodiment, is when the distance between fence body 32 and saw blade 20 is twenty inches. When fence assembly 30 is adjusted to beyond twenty inches from saw blade 20, first scale 164 will no longer be able to be aligned with primary pointer 168 due to the fact that the increased adjustment of fence assembly 30 causes first scale 164 to move beyond primary pointer 168 and eventually out of view through first viewing aperture 170. When this occurs, second scale 166 can be aligned with secondary pointer 172 as viewed through aperture 174 for the remaining adjustment distance of fence assembly 30. While FIG. 10C illustrates the simultaneous crossover from first scale 164 to second scale 166, it is within the scope of the present invention to include an amount of overlap between the two scales 164 and 166 such that the same distance will be indicated in both apertures 170 and 174 for the overlapping distance. The operation of second scale 166, secondary pointer 172 and second aperture 174 is identical to that described above for first scale 164, primary pointer 168 and first aperture 170. The adjustment of fence assembly 30 can thus be indicated to the end of second scale 166 at which point pinion gears 152 come to the end of racks 140.

With reference to FIG. 27 a second embodiment of a cutting width adjustment mechanism is shown. The mechanism includes transparent L-shaped bracket 270 having a cross-hair 272 disposed within an upper horizontal portion, and two elongated slots 274 disposed in the lower vertical portion. Bracket 270 rests upon front movable rail 360 near one end and is secured thereto by screws 276 disposed through slots 274 and corresponding holes formed in rail 360. The inner ends of screws 276 are received within the open portion of C-shaped stationary rail 356. Scale 278 is formed integrally with table 14, and is positioned between the front edge of table 14 and rails 356 and 360.

When fence 338 is moved adjacent to blade 20, bracket 270 and in particular, cross-hair 272, generally points to zero on scale 278. When fence assembly 338 is moved by movement of outer rails 360 so as to be spaced from blade 20, cross-hair 272 moves an identical distance and thus indicates the width of cut on scale 278. The provision of slots 274 and screws 276 allow for adjustments in the zero position of cross-hair 272. When screws 272 are loosened, bracket 270 may be slid along rail 360 for a distance generally equal to the length of slots 272. When the desired position is obtained, the screws are tightened. The zero position of scale 278 may be adjusted to accommodate saw blades having different kerf thicknesses, as well as the use of auxiliary fences. For example, pieces of wood may be secured to the front of fence assembly to act as an auxiliary fence.

Figure 11A:
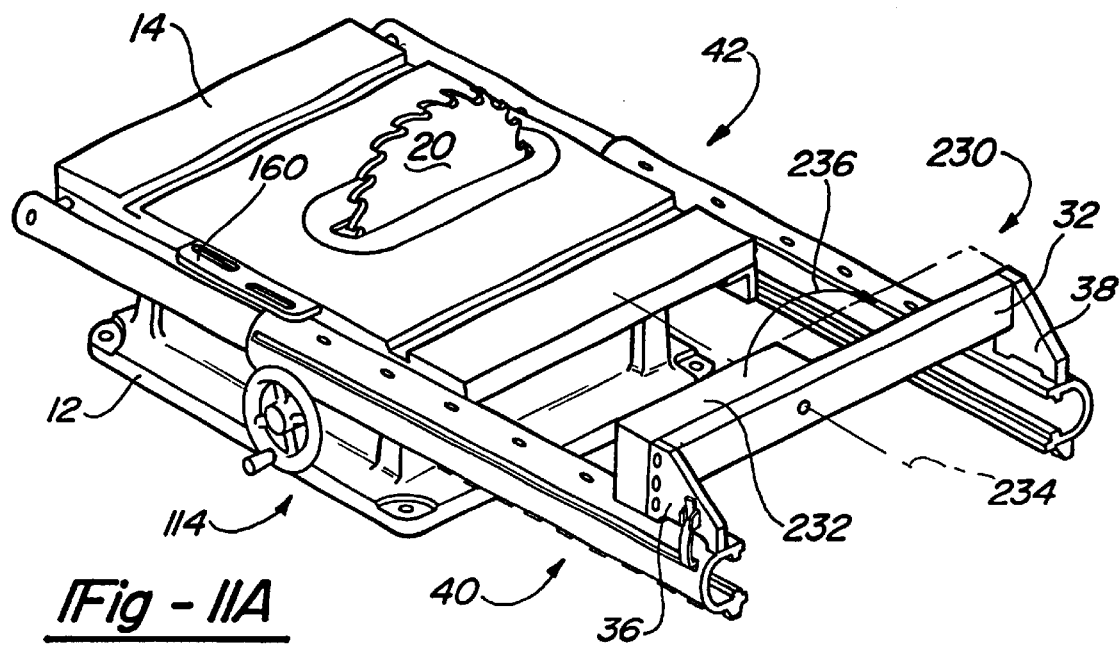
FIG. 11A is a perspective schematic of the rip fence assembly of the present invention modified to meet European standards with the rip fence mounted in the right hand side of the cutting tool.
Figure 11B:
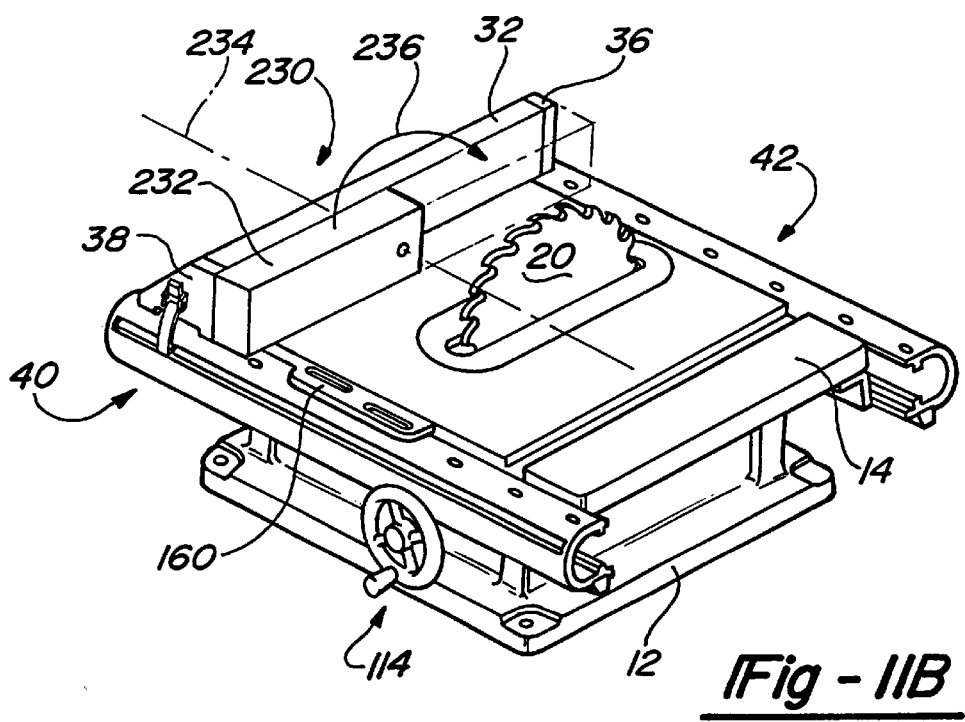
FIG. 11B is a perspective schematic of the rip fence assembly of the present invention modified to meet European standards with the rip fence mounted in the left hand side of the cutting tool.

FIGS. 11A and 11B illustrate another embodiment of the present invention. A fence assembly 230 is identical to fence assembly 30 with the exception of a secondary fence body 232 which is pivotably secured to fence body 32. In certain foreign countries, safety regulations do not permit the rip fence to extend on both sides of the center axis of the cutting tool. Thus, secondary fence 232 must not extend through a vertical plane extending perpendicular to saw blade 20 and passing through the axis of rotation of saw blade 20. A low cost solution to this problem is to incorporate secondary fence body 232 into fence body 32. Fence body 232 is pivotable with respect to fence body 32 about an axis 234 as shown by arrow 236 between a first position as shown in solid line in FIG. 11A and a second position as shown in dot-dash lines in FIG. 11A. When fence 32 is positioned on the right side of saw blade 20 and fence body 232 is located in its first position as shown in FIG. 11A, fence body 232 extends from front mount 36 to the center of saw blade 20 but not beyond the center of saw blade 20. When fence 32 is moved to the left side of saw blade 20 and fence body 232 is located in its second position as shown in FIG. 11B, fence body 232 now extends form rear mount 38 to the center of saw blade 20 but not beyond the center of saw blade 20. The function and operation of fence assembly 230 is identical to that described above for fence assembly 30. Although not shown in the drawings, fence body 232 could also incorporate a pivotable support similar to pivotable support 34 of fence assembly 30 to provide for additional support of the article being cut when fence body 232 is positioned beyond work table 14. It is also within the scope of the present invention to have pivotable support 34 of fence assembly 30 of such a dimension that it supports fence body 232 and the article being cut when fence body 232 is added to fence body 32 and is positioned beyond work table 14.

Figure 12A:
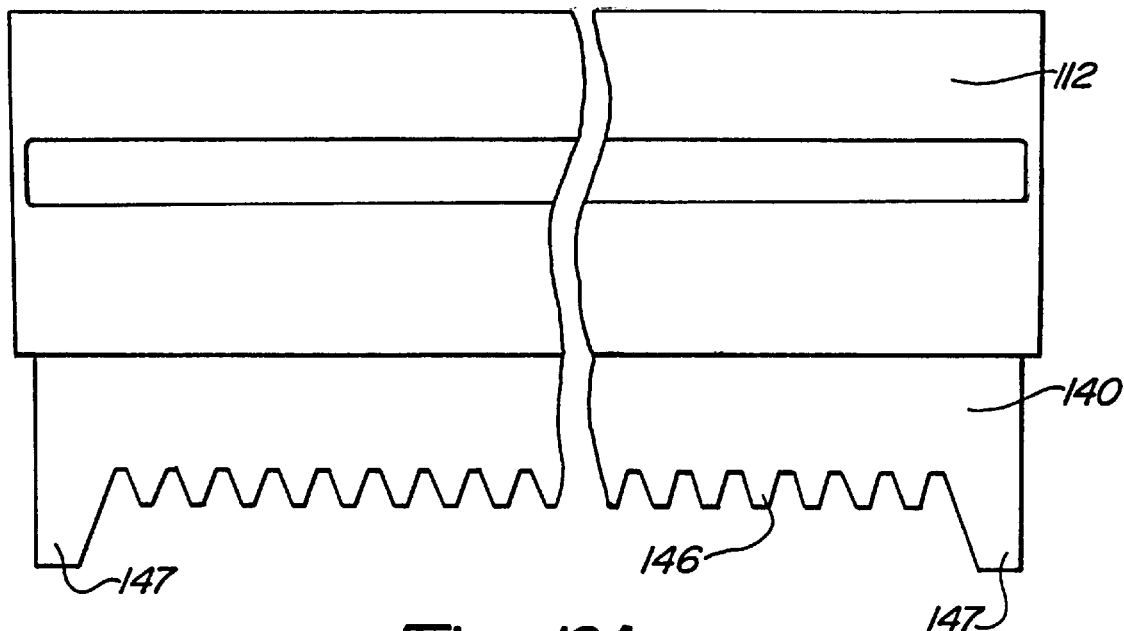
FIG. 12A is a side elevational view of a rack illustrating a method of limiting the travel of the rack with respect to the pinion.
Figure 12B:
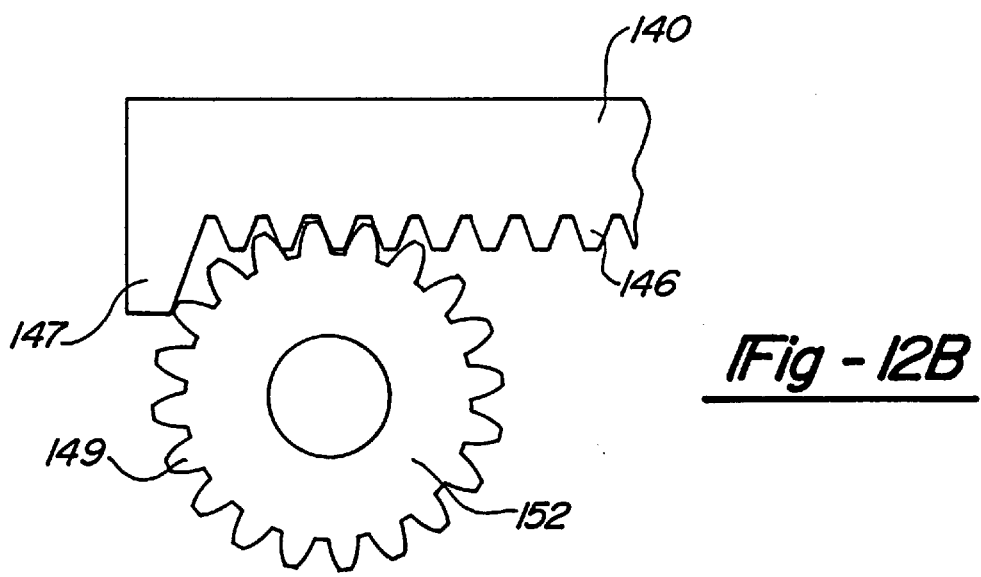
FIG. 12B is a side elevational view of a rack and pinion gear illustrating the travel limitation feature shown in FIG. 12A.

FIGS. 12A and 12B illustrate a structure which can be incorporated into rack and pinion fence assembly 30 in order to limit the travel of outer rail 112 with respect to inner rail 110. Outer rail 112, shown in FIG. 12A, includes rack 140 which includes the plurality of rack teeth 146 extending over the entire exposed surface of the rack. Rack teeth 146 are designed to mate with pinion gear 152 in order to longitudinally move outer rail 112 with respect to inner rail 110 due to the rotation of pinion gear 152.

In order to limit the travel of outer rail 112 with respect to inner rail 110 in either direction, rack 140 is provided with an enlarged tooth 147 located at each end of rack 140. As shown in FIG. 12B, pinion gear 152 includes a plurality of teeth 149 which mesh with rack teeth 146. When pinion gear 152 comes to either of the ends of rack 140, one of the pinion gear teeth 149 contacts enlarged tooth 147 on rack 140 prohibiting additional movement of outer rail 112. The contact between tooth 149 and enlarged tooth 147 is designed to occur at the tip of gear tooth 149 rather than on one of the faces of gear tooth 149. This tip contact causes the contact force to be applied normally to the end of the tooth 149 and thus creates a force which is normal to the tooth or along a radial line to minimize any type of deformation of gear tooth 149, eliminate damage to the faces of gear tooth 149 and provide line contact between the two gear teeth such that the tendency of pinion gear 152 to roll over rack 140 is eliminated.

FIG. 13 shows another embodiment of the present invention. The embodiment shown in FIG. 13 operates in a similar manner to that shown in FIG. 2, with the differences between the two embodiments being in the configuration of the individual components. Rack and pinion fence assembly 330 comprises a rack and pinion assembly 332, a pair of telescoping tubular side rail assemblies 334 and 336 and an elongated fence assembly 338.

The present invention allows the fence assembly to be moved over a range of lengths which exceeds the length of the stationary rails. The fence assembly may be positioned outwardly of at least one side edge of the work table without requiring that the stationary rails extend outwardly of this side edge. Preferably, the fence assembly can be moved beyond the width of the work table, outwardly of either side edge, without requiring that the stationary rails have a length which is greater than the width of the table to provide for such movement. Further, the fence may be connected to both front and rear movable rails which telescopically engage and slide over front and rear stationary rails. The front and rear movable rails are interconnected, for example, by a rack and pinion mechanism or a system of pulleys, which ensure that movement of one movable rail causes an equal movement of the other movable rail. Thus, the fence may be maintained parallel to the saw blade as it is moved relative thereto.

Figure 14A:
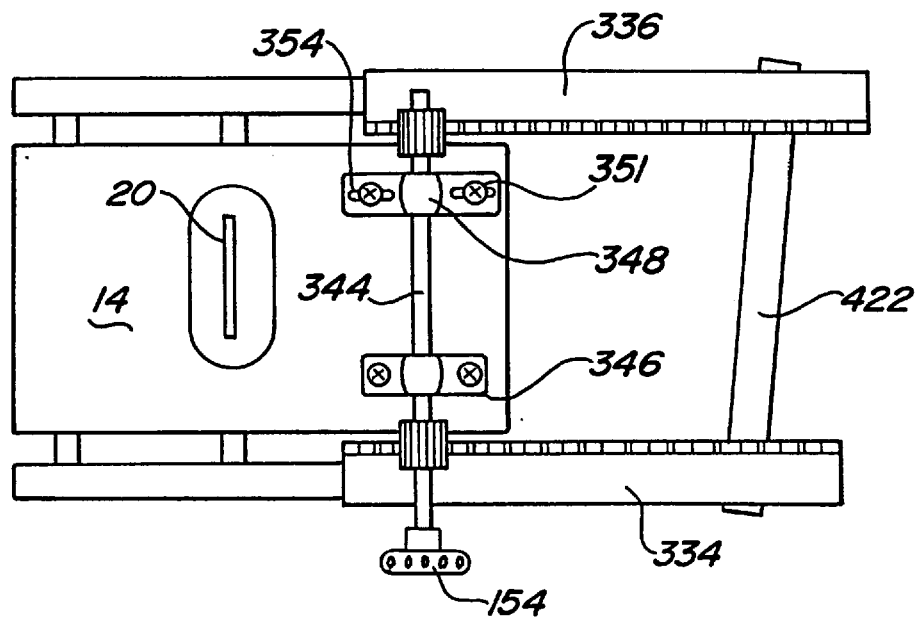
FIG. 14A is a bottom view of the adjustment system shown in FIG. 14 with the fence being in a non-parallel position with respect to the saw blade.
Figure 14B:
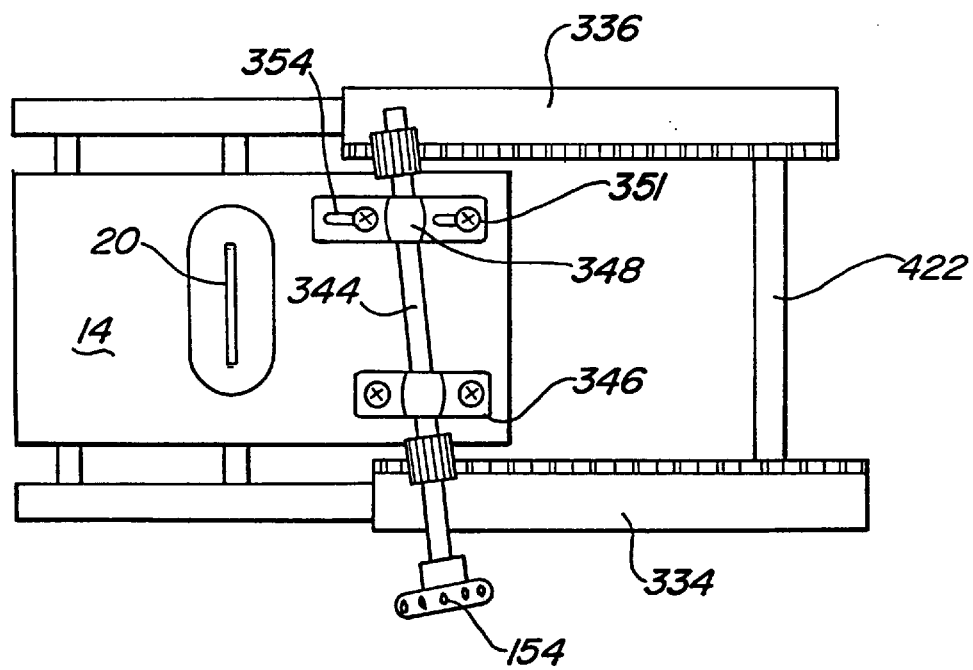
FIG. 14B is a bottom view similar to 14A but showing the table saw after adjustment of the fence to a position parallel to the saw blade.

Referring now to FIG. 14, rack and pinion assembly 332 comprises a front pinion gear 340, a rear pinion gear 342, a pinion shaft 344, a front bearing mount 346 and a rear bearing mount 348. Front and rear pinion gears 340 and 342 are fixedly secured to pinion shaft 344 for rotation therewith. Pinion gears 340 and 342 engage telescoping side rail assemblies 334 and 336 as will be described later herein. Pinion shaft 344 extends through front bearing mount 346 and rear bearing mount 348 which provide for the rotation of pinion shaft 344. Adjustment wheel 154 is secured to pinion shaft 344 to facilitate the movement of side rail assemblies 334 and 336 in a similar manner to that described above for rack and pinion assembly 30. Front pinion bearing mount 346 is mounted to the underside of work table 14 by a pair of screws 350. Rear pinion bearing mount 348 is mounted to a slotted adjustment plate 352 by a pair of screws 350. Adjustment plate 352 includes a pair of slotted apertures 354 which are utilized to mount adjustment plate 352 and thus rear pinion bearing mount 348 to the underside of work table 14 using a pair of screws 351. Slotted apertures 354 allow for the adjustment of the transverse position of rear pinion gear 342 with respect to front pinion gear 340 thus providing a mechanism for ensuring that fence 422 is parallel to saw blade 20. As shown in exaggeration in FIG. 14A, with bolts 351 generally centered in slotted apertures 354, fence 422 may not be parallel to blade 20. By loosening bolts 351 and moving plate 352 and thus bearing mount 348 laterally to the position shown in exaggeration in FIG. 14B fence 422 may be made parallel to blade 20. In a preferred embodiment, slotted apertures 354 will allow the axis of the pinion shaft 344 to be shifted by ¼°.

Figure 18:
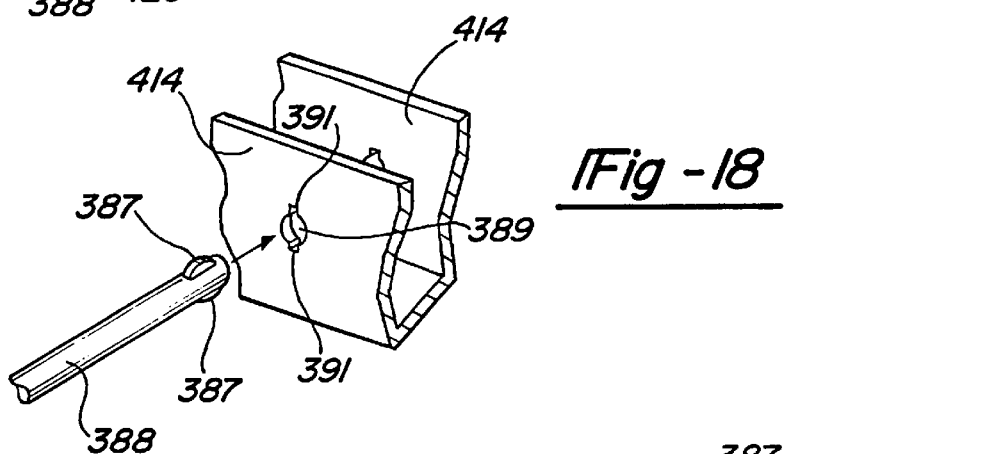
FIG. 18 is a perspective view illustrating the locking pivotable connections utilized in the locking mechanism shown in FIGS. 15 through 17.
Figure 19:
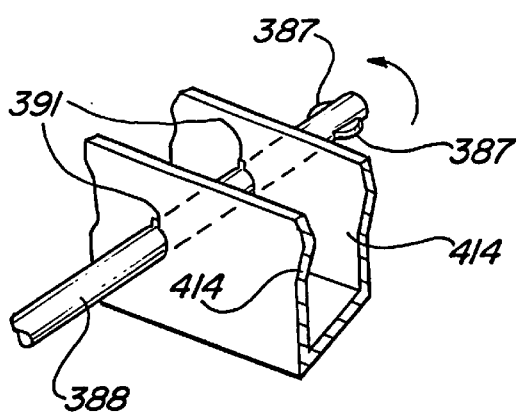
FIG. 19 is a perspective view similar to FIG. 18 but illustrating the locking pivotable connection in its locked position.
Figure 20:
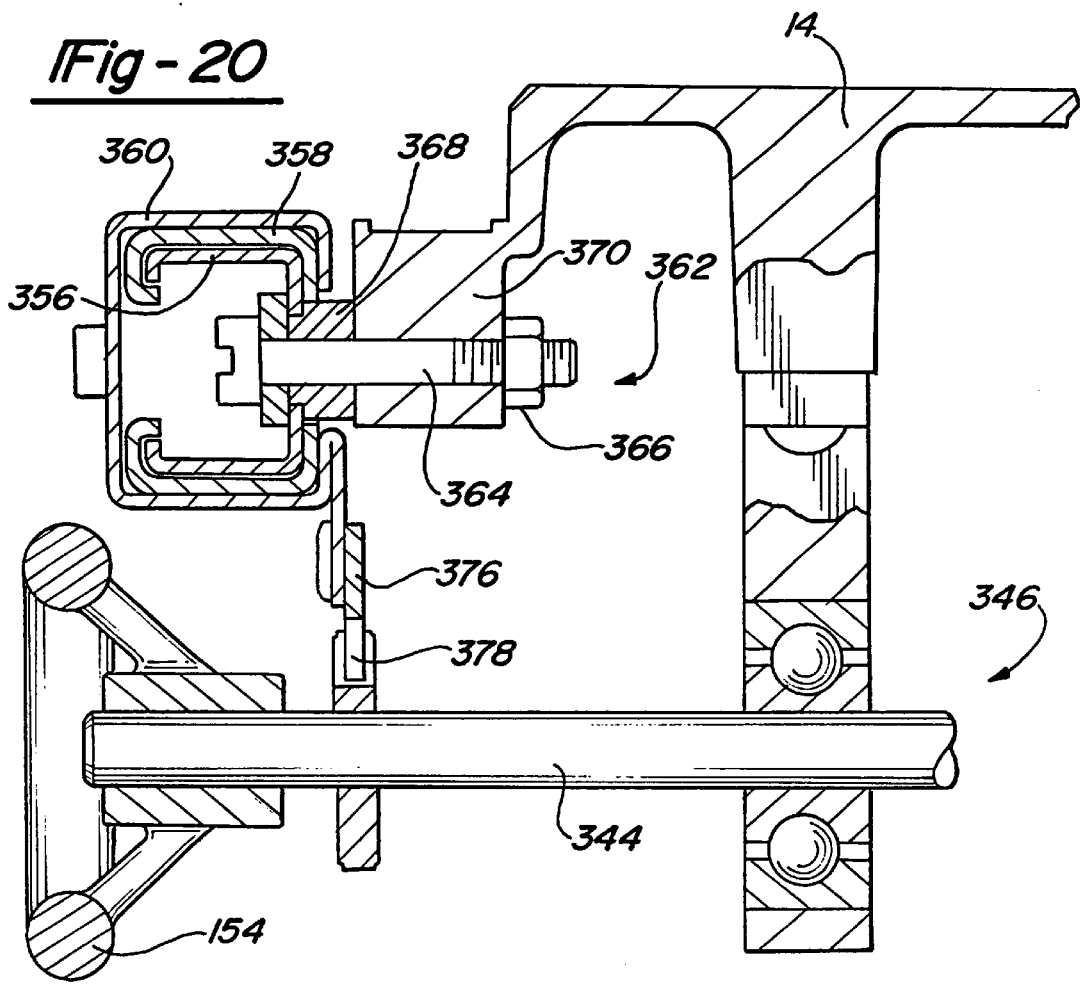
FIG. 20 is a side elevational view, partially in cross-section, of the telescoping rail of the rack and pinion assembly shown in FIG. 13 illustrating the attachment of the inner rails and the pinion shaft to the table saw.

Referring now to FIGS. 15 through 20, front and rear telescoping tubular side rail assemblies 334 and 336 are each comprised of fixed inner rail 356, a glide strip 358 and slidable outer rail 360. Inner rail 356 is a generally C-shaped tubular member with square edges having a specified length which, in the preferred embodiment, is generally equal to the width of work table 14. Inner rail 356 is connected to work table 14 using a plurality of fasteners 362 which are spaced along the entire length of inner rail 356 in a similar manner to that shown for inner rail 110 of assembly 30. Alternately, rails 356 may be formed integrally with table 14. As shown in FIG. 20, fasteners 362 include a bqlt 364, a nut 366 and a bushing 368. Bolt 364 extends through inner rail 356 and through a bracket 370 which is an integral part of or is secured to work table 14. Bushing 368 is located between inner rail 356 and bracket 370 with the assembly being secured by nut 366 being threadably received on bolt 364. Access to each bolt 364 is provided by the open end of C-shaped tubular inner rail 356. Inner rail 356 of side rail assembly 334 is connected to the front of work table 14 generally parallel to front edge 48 of work table 14 while an identical inner rail 356 of side rail assembly 336 is connected in a similar manner to the rear of work table 14 generally parallel to rear edge 50. Preferably both inner rails 356 extend along the entire width of work table 14 to provide the maximum amount of support for outer rails 360 while still maintaining a minimized envelope for table saw 10 for both storage and portability. However, inner rails 356 may extend for less than the entire width of table 14. Glide strip 358 is wrapped around inner rail 356 to facilitate the movement of outer rail 360 with respect to inner rail 356. In the preferred embodiment, glide strip 358 is made of UHMW polyethylene.

Outer rail 360 is a generally C-shaped tubular member which is slidingly received over inner rail 356 and slide strip 358. As shown in FIGS. 13 and 14, the external face of each outer rail 360 is adapted at each end to locate and secure elongated fence assembly 338 to side rail assemblies 334 and 336. Each end of outer rail 360 includes an aperture 372 and a stud 374 which mate with fence assembly 338 as will be described later herein. One aperture 372 and one stud 374 are located at the opposite ends of outer rail 360 to permit the positioning of fence assembly 338 on either side of saw blade 20 to maximize the versatility of fence assembly 330.

As shown in FIGS. 13 and 14, outer rail 360 includes a rack 376 which can be integral with outer rail 360 or it can be a separate component attached to a lower extending flange of outer rail 360 by a plurality of screws. Rack 376 extends over the entire length of outer rail 360. Rack 376 includes a plurality of rack teeth 378 which extend over the entire surface of the rack. Rack teeth 378 are designed to mate with pinion gears 340 and 342 in a similar manner to that described above for assembly 30. The mating of racks 376 of each outer rail 360 with pinion gears 340 and 342 disposed on a common shaft 344 ensures that the outer rail of one of side rail assemblies 334, 336 will always move an equal distance with the outer rail of the other side rail assembly. Thus, each end of fence assembly 338 will always be displaced an equal distance whenever the fence assembly is moved due to the movement of the outer rails. Accordingly, the longitudinal surface of fence body 422 is maintained parallel to the saw blade. The method illustrated in FIGS. 12A and 1 2B for limiting the travel of outer rail 360 with respect to inner rail 356 may also be incorporated into rack and pinon fence assembly 330 if desired.

Figure 17:
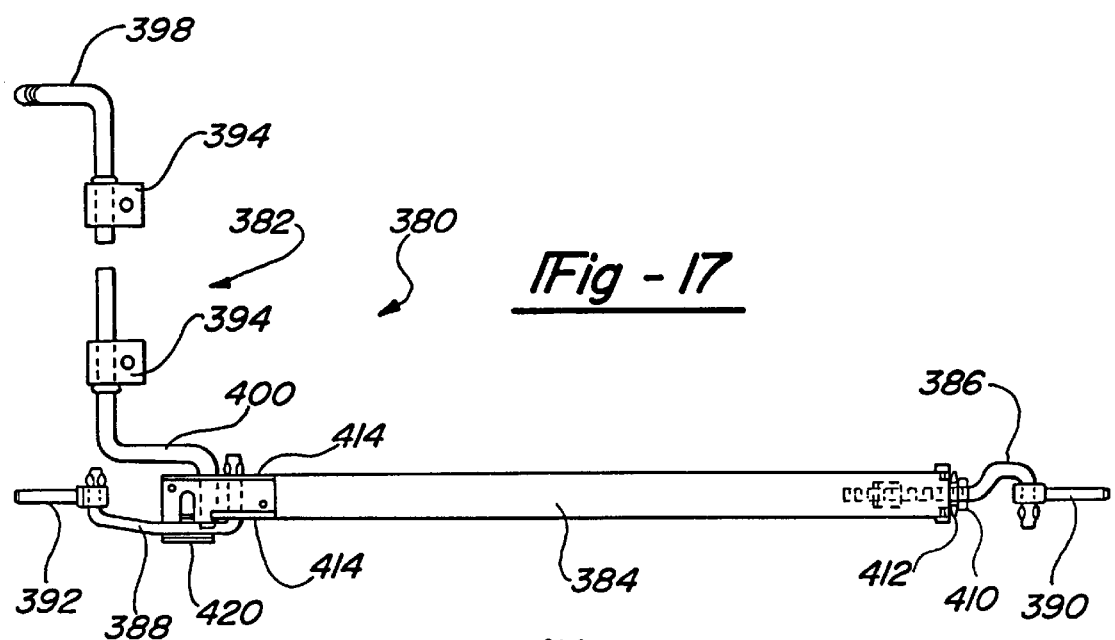
FIG. 17 is a plan view of the locking mechanism shown in FIGS. 15 and 16.

FIGS. 15 through 17 also illustrate an over-center toggle lock assembly 380 which locks outer rails 360 to inner rails 356 when outer rails 360 have been moved to a desired location. Lock assembly 380 comprises a lock lever 382, a lock arm 384, a rear lock link 386, a front lock link 388, a rear lock pin 390 and a front lock pin 392. Lock lever 382 is pivotably secured to work table 14 by a pair of bearing blocks 394 which are bolted to the underside of work table 14. Lock lever 382 includes a forward arm 398 which is utilized to actuate lock assembly 380 from the front of table saw 10 and a rear arm 400 which is pivotably secured to lock arm 384. Lock arm 384 includes a slot 402 at one end which receives rear arm 400 and an aperture 404 at the opposite end which receives rear lock link 386. Rear lock link 386 is a threaded rod which mates with link arm 384 at one end and is pivotably connected in a horizontal plane to rear lock pin 390 at its opposite end. Front and rear lock pads 418 and 408 are secured to table 14 adjacent slidable rails 360. In the preferred embodiment, pads 418 and 408 are flexible and are made of sheet steel. Pads 418 and 408 are designed to flex inwardly out of contact with outer rails 360, thereby allowing outer rails 360 to slide freely over friction pads 358, as shown in FIG. 15.

Rear lock pin 390 extends through an aperture 406 in work table 14 adjacent to rear lock pad 408. As described further below, pin 390 may be moved into contact with pad 408 to lock outer rail 360 of side rail assembly 336 to its corresponding inner rail 356. An adjusting nut 410 is threadingly received on rear lock link 386 and a plurality of Belleville disc springs 412 are disposed between adjusting nut 410 and lock arm 384. Disc springs allow for the adjustment to the load which needs to be applied to lock lever 382 to actuate lock assembly 380 as will be described later herein.

Lock arm 384 also includes a pair of flanges 414 which are located on the end of lock arm 384 adjacent to slot 402. Front lock link 388 is pivotably connected to flange 414 at one end and pivotably connected to front lock pin 392 at the opposite end. Front lock pin 392 extends through an aperture 416 in work table 14 adjacent to front lock pad 418 and may be moved into contact with pad 418 to lock outer rail 360 of side rail assembly 334 to its corresponding inner rail 356.

FIGS. 18 and 19 illustrate the locking pivotal connection between front lock link 388 and flange 414 of lock arm 384. It is to be understood that a similar locking pivotal connection is provided at the pivotal connection between front lock link 388 and front lock pin 392 and between rear lock link 386 and rear lock pin 390.

Front lock link 388 is provided with a pair of formed upstanding tabs 387. Flanges 414 each include a generally circular aperture 389 having a pair of slots 391 corresponding with the pair of tabs 387. As shown in FIG. 18, front lock link 388 is inserted through aperture 389 while the pair of tabs 387 are in alignment with the pair of slots 391. Once link 388 is inserted through each flange 414, it is rotated to its working position as shown in FIG. 19. The working position for lock fink 388 positions the pair of tabs 387 out of alignment with the pair of slots 391 thus prohibiting removal of lock link 388 from lock arm 384.

The released position of over-center toggle lock assembly 380 is shown in FIG. 15. In this position, the pivot point A between front lock pin 392 and front lock member 388, the pivot point B between lock arm 384 and front lock member 388, and the pivot point C between rear lock link 386 and rear lock pin 390 are not in alignment. As the mechanism is moved to its locked position by rotating arm 398 downwardly, as shown in FIG. 16, the above pivot points are moved more In line. As they are moved in line, the overall length of lock arm 384, lock links 386, 388 and pins 390, 392 is increased such that pins 390, 392 are moved outwardly into contact with pads 408, 418 which are pushed into contact with and lock outer rails 360. Disc springs 412 are compressed during this movement, and exert a locking force on arm 384, and links 386, 388. The provision of springs 412 assists in the locking action. However, the spring force tends to push the pivot points out of line, accordingly, in order to lock or "Sparks" over-center toggle lock assembly 380, the pivot points are allowed to move slightly past the in-line position until lock links 388 come to rest against a stop 420 located on lock arm 384. The spring force will attempt to move the pivot points more out-of-line, i.e., upwardly towards the table, and thus hold assembly 380 in the locked or "parked" position.

Figure 13A:
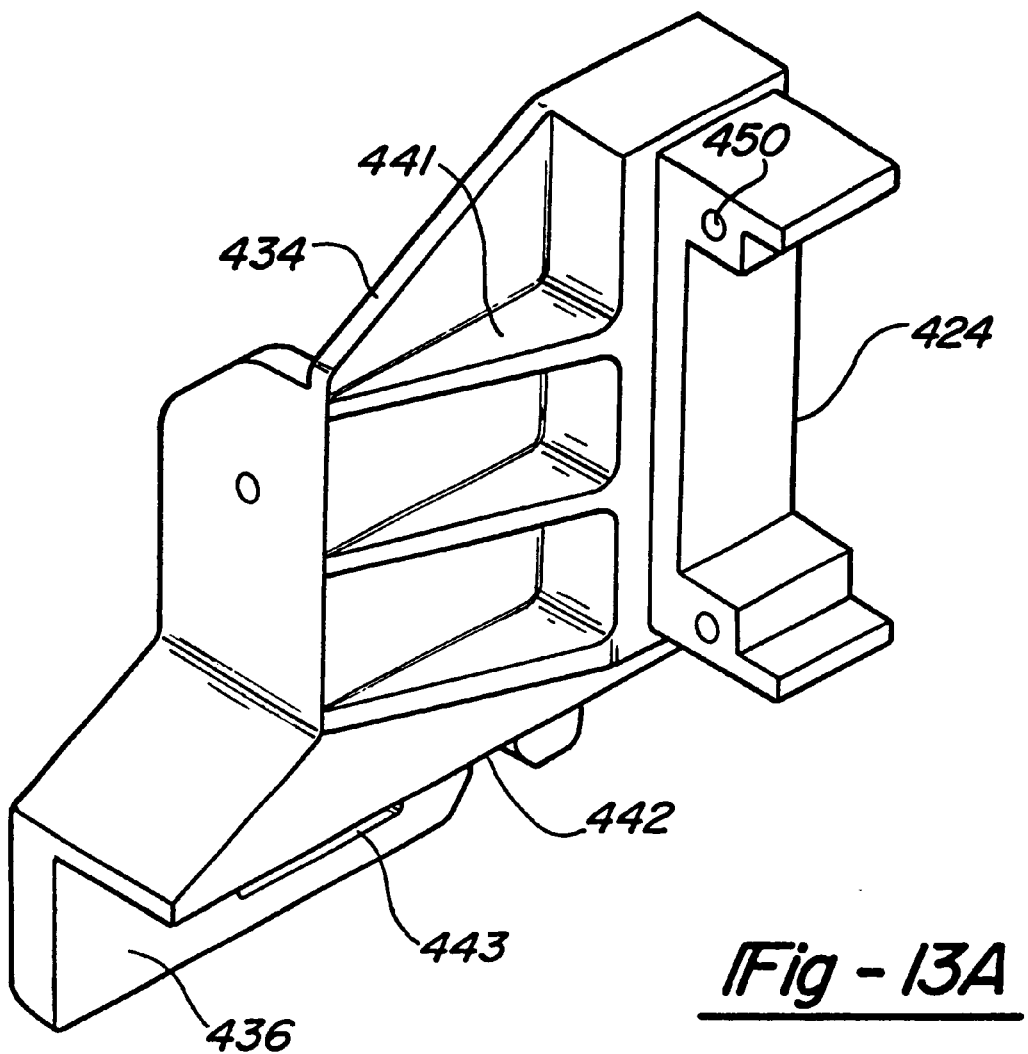
FIG. 13A is a perspective view of a fence mount shown in FIG. 13.

Referring now to FIGS. 13, 13A, elongated fence assembly 338 comprises an elongated fence body 422, a front fence mount 424, a rear fence mount 426 and a pivotable support member 428. Fence body 422 is an elongated hollow rectangular member which provides a flat guide surface 430. Fence body 422 is sized to extend beyond both the front and rear longitudinal edges 48 and 50 of work table 14. Fence body 422 is secured at its opposite ends to front fence mount 424 and rear fence mount 426 using a pair of bolts 432. The attachment of fence mounts 424, 426 to fence body 422 will be described later herein. Fence body 422 includes upper and lower circular apertures 444 at each end extending through the wall of fence body 422 opposite to guide surface 430. Fence mounts 424, 426 include a pair of fingers 440 which extend into the hollow interior of fence body 422. Each finger 440 include a threaded hole 450 which accepts a respective bolt 432. Bolts 432 are inserted into the circular apertures 444 and are threadingly received within threaded holes 450 on the fingers 440.

Referring now to FIGS. 13, 13A, 14 and 21, fence mounts 424, 426 will be described in greater detail. It is to be understood that rear fence mount 426 is a mirror image of front mount 424 and the description below applies to both front and rear fence mounts 424 and 426. Front fence mount 424 includes a main body 434, an L-shaped bracket 436 which extends down from body 434, an over-center latch 438 which extends between body 434 and bracket 436 and a pair of fingers 440 which extend inwardly from body 434. Body 434 also includes support ribs 441. L-shaped bracket 436 is designed to mate with a respective outer rail 360. L-shaped bracket 436 defines a slot 442 which engages a respective stud 374 located on the respective outer rail 360 and opening 443 which corresponds with aperture 372 in outer rail 360. The engagement between stud 374 and slot 442 properly positions fence mounts 424, 426 with respect to the corresponding outer rail 360. Stud 374 and slot 442 are provided to more accurately position fence mounts 424, 426 on outer rail 360 rather than relying solely on the connection of over-enter latch 438 to aperture 372. Once slot 442 engages stud 374, over-center latch 438 is connected to aperture 372 in outer rail 360 and then moved to its locked position to secure fence mounts 424, 426 to their respective outer rails 360. With reference to FIG. 27, alternative construction of the fence mounts is shown as fence mounts 424' and 426'. With reference to front fence mount 424', a slot 442' extends to the right of the over-center latch in this embodiment.

Figure 21:
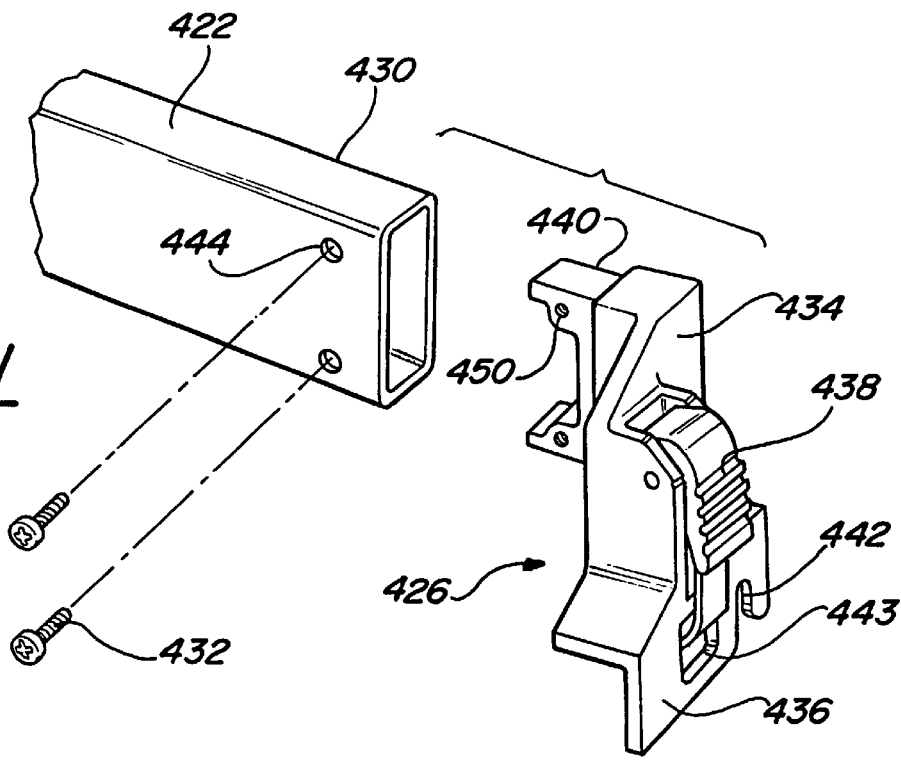
FIG. 21 is a perspective view of the connection between the fence and the fence mount of the rack and pinion fence assembly shown in FIG. 13.
Figure 21A:
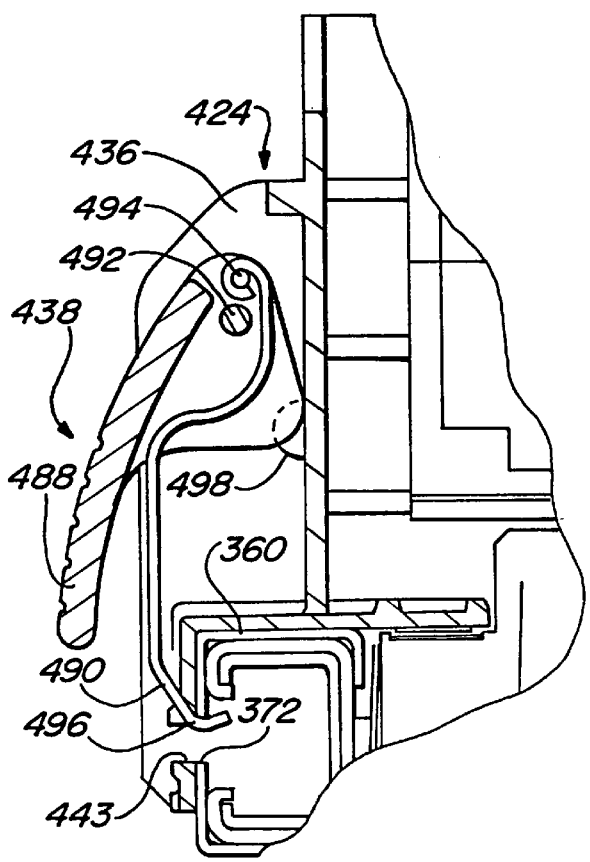
FIG. 21A is a side view of the over-center latch which locks the fence assembly to the movable rails with the latch in its closed position.
Figure 21B:
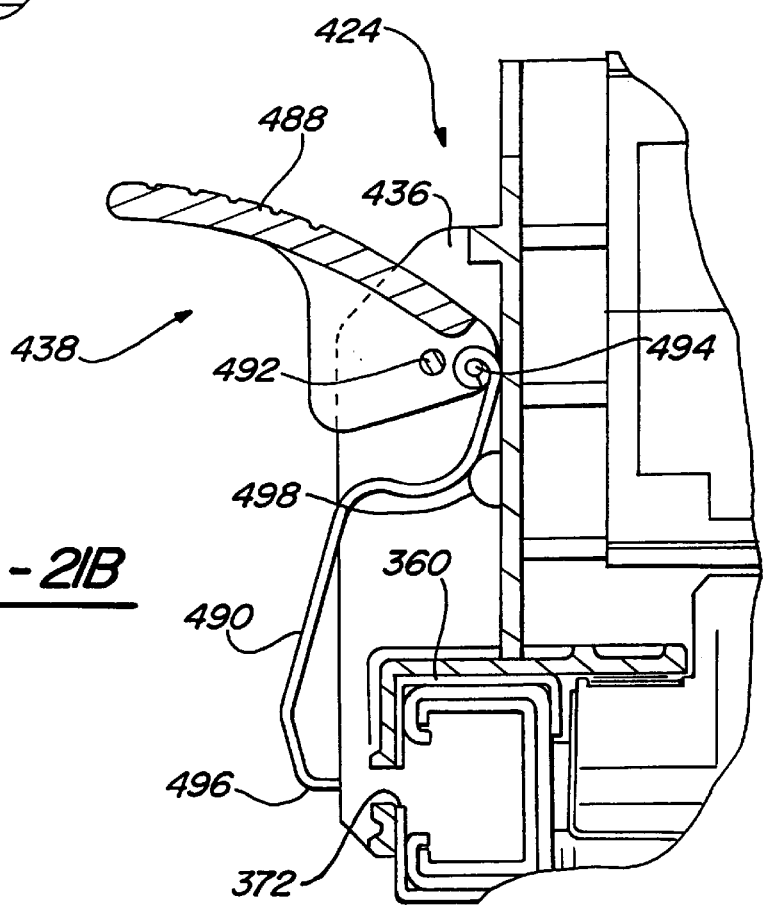
FIG. 21B is a side view similar to FIG. 21A but showing the over-center latch in its open position.

FIGS. 21A and 21B illustrate over-center latch 438 in cross-section in both the latched position (FIG. 21A) and the released position (FIG. 21B). Over-center latch 438 comprises a latch 488 and a clasp 490. Latch 488 is pivotably secured to mount 436 by a pin 492 and clasp 490 is pivotably secured to latch 488 by a pin 494. Clasp 490 is an S-shaped member which includes a hooked end 496 for mating with aperture 372 to secure fence mount 424 to outer rail 360. Latch 488 is held in its downward or latched position due to a spring force being exerted by clasp 490 and the geometry of over-center latch 438 where pin 494 is positioned over the center of a line defined by pin 492 and hooked end 496 mating with aperture 372.

Over-center latch 438 is released by lifting latch 488 and pivoting pin 494 around pin 492 and thus moving pin 494 back over-center and towards aperture 372. The raising of latch 488 first releases the spring tension on clasp 490 and then moves hooked end 496 into a position to be removed from aperture 372. At this point in the movement of latch 488, clasp 490 contacts a camming surface 498 located on fence mount 424. Continued upward movement of latch 488 causes hooked end 496 to withdraw from aperture 372 due to the camming action between clasp 490 and camming surface 498. Once hooked end 496 has been withdrawn from aperture 372, removal of fence mount 424 can be accomplished by simply lifting fence mount 424 off of outer rail 360.

Figure 21C:
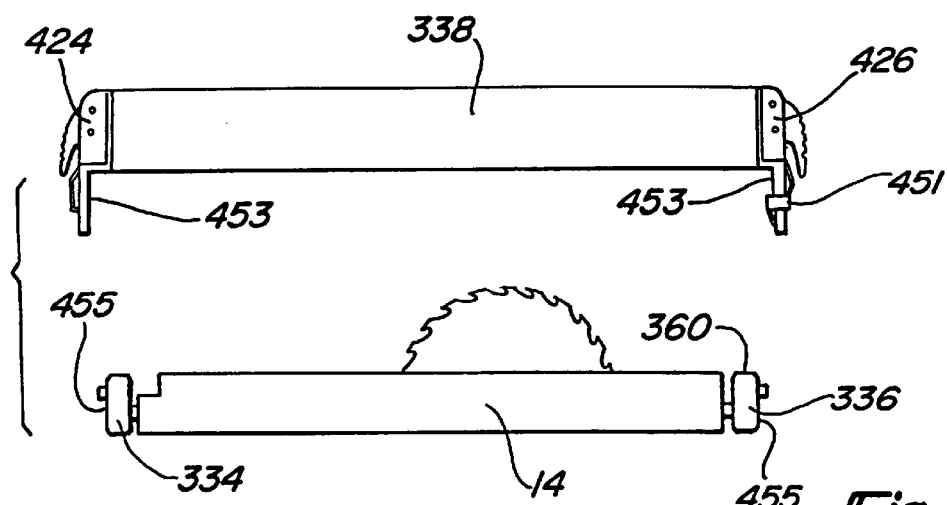
FIG. 21C is an exploded side view of the fence assembly and the work table of the present invention showing the incorporation of a biasing spring.
Figure 21D:
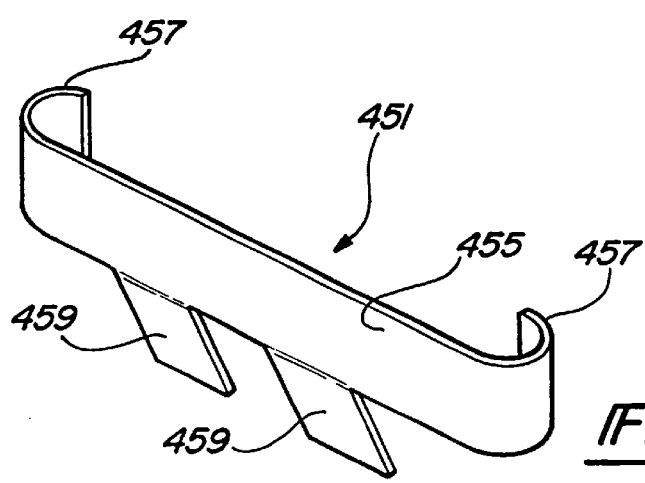
FIG. 21D is a perspective view of the biasing spring shown in FIG. 21C.

FIGS. 21C and 21D illustrate a spring 451 which is designed to be inserted between fence mount 426 of fence assembly 338 and outer rail 360 of side rail assembly 336. FIG. 21C illustrates fence assembly 338 incorporating biasing spring 451 which is clipped onto rear fence mount 426. FIG. 21C further illustrates work table 14 including side rail assemblies 334 and 336. Fence assembly 338 is positioned over side rail assemblies 334 and 336. Thus, the dimension between opposing faces 453 on fence mounts 424 and 426 must always be larger than the dimension over the outer surfaces 455 on side rail assemblies 334 and 336. When the tolerance stack up is taken into consideration, there could be excessive clearances provided between fence assembly 338 and side rail assemblies 334 and 336. Spring 451, shown in FIG. 21D, includes a body 455 having a retaining tab 457 located at opposite sides of body 455. Retaining tabs 457 are designed to encircle the opposite ends of fence mount 426 to retain spring 451 in position against face 453 of fence mount 426. Spring 451 further includes a pair of legs 459 which extend vertically from body 455 and each of which is bent towards the same side of body 455 as are tabs 457. When assembled to fence mount 426, body 455 is spaced away from surface 453 due to both the shape of retaining tabs 457 and the shape of legs 459 as shown in FIG. 21C.

When fence assembly 338 is positioned over side rail assemblies 334 and 336, legs 459 of spring 451 help to guide the assembly to insure that spring 451 will be located between face 453 of fence mount 426 and surface 455 of side rail assembly 336. Once assembled, spring 451 biases fence assembly 338 away from side rail assembly 336 to remove the clearances between the two members.

Figure 22:
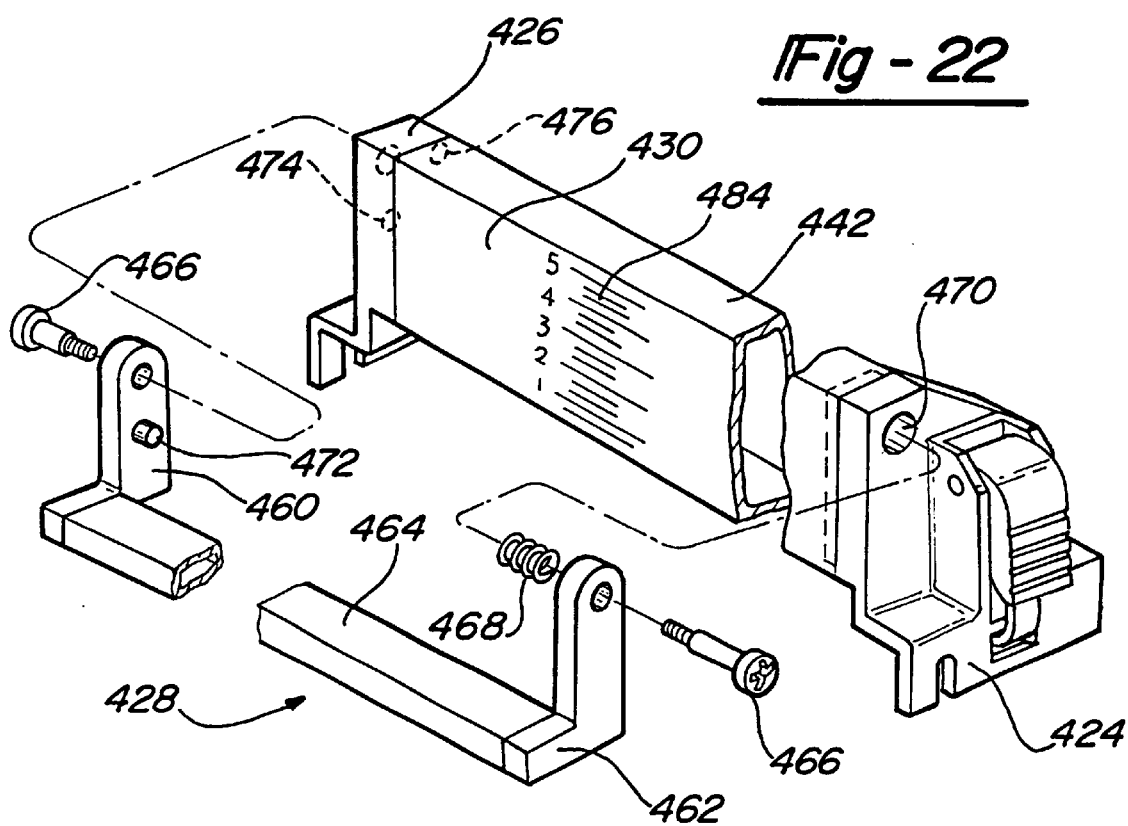
FIG. 22 is a perspective view of the pivotable workpiece support for the rack and pinion assembly of the present invention.
Figure 23:
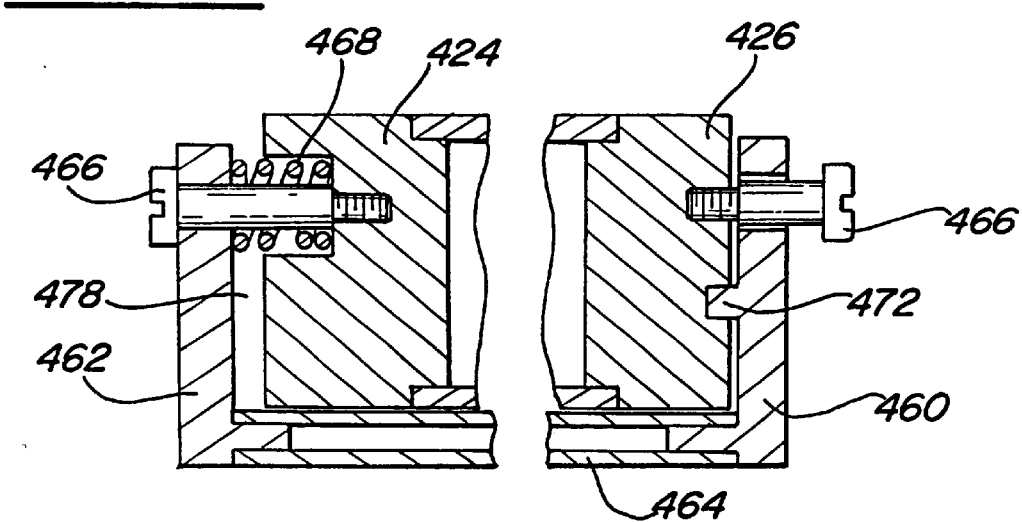
FIG. 23 is a longitudinal cross-sectional view of the pivotable workpiece support and the fence shown in FIG. 22 illustrating the locking feature for the support.

Referring to FIGS. 22 and 23, pivotable support member 428 comprises a rear pivot arm 460, a front pivot arm 462 and a support plate 464. Pivotable support member 428 provides support for the workpiece at a point adjacent to guide surface 430 when fence body 422 is positioned beyond work table 14. Pivotible support member 428 is movable between a lower position and a raised position similar to that shown in FIGS. 1, 2 and 4 of the previous embodiment. Pivotable support member 428 is provided with a locking mechanism to lock it in either of the raised or lowered positions as will be described later herein.

Support plate 464 extends between and is connected to front and rear pivot arms 462 and 460. Front pivot arm 462 is pivotably secured to front fence mount 424 using a shoulder bolt 466. A coil spring 468 is located in a spring pocket 470 in front fence mount 424 and operates to bias front pivot arm 462 away from front fence mount 424. Rear pivot arm 460 is pivotably secured to rear fence mount 426 also using a shoulder bolt 466. A locking post 472 extends inward from the surface of pivot arm 460 which is adjacent to rear fence mount 426. Locking post 472 is adapted to engage a first locating hole 474 when support member 428 is in its lower position and a second locating hole 476 when support member 428 is in its upper position. Rear pivot arm 460 is biased toward rear fence mount 426, and thus post 472 into one of the two locking holes 474 and 476, by the load exerted by coil spring 468 acting against front pivot arm 462. Thus, pivot arm 460 may be locked in either the upper or lower position. This biasing load is transferred to rear pivot arm 460 by support plate 464. The distance between front and rear pivot arms 462 and 460 is greater than the distance across front and rear fence mounts 424 and 426 by a distance which is greater than the height of post 472. Thus, when post 472 is in engagement with one of the two locating holes 474 or 476, a gap 478 is created between front pivot arm 462 and front mount 424. In order to move support member 428 between positions, front pivot arm 462 is pushed towards front fence mount 424 to release locking post 472 from the hole. Support member 428 can then be pivoted to the other position with the subsequent release of rear pivot arm 462 causing engagement of post 472 with the other hole due to the biasing of spring 468.

FIG. 22 also illustrates another unique embodiment of the present invention. Guide surface 430 of fence body 422 includes a scale 484 which is useful when setting the height of saw blade 20. Scale 484 is designed to indicate a zero reading at the top of work table 14 and increase vertically upward. Thus by positioning fence body 422 adjacent to saw blade 20, a direct reading of the depth of cut or height of saw blade 20 is given. Scale 484 is etched onto or machined into surface 430 and thus does not interfere with the function or accuracy of surface 430.

Figure 24A:
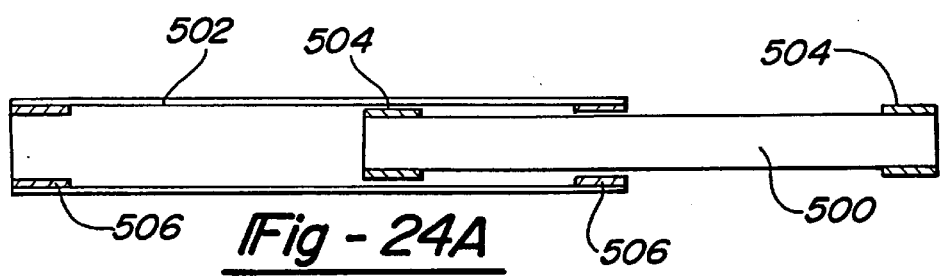
FIGS. 24A and 24B are schematic illustrations of the telescoping fence assembly according to the present invention.
Figure 24B:
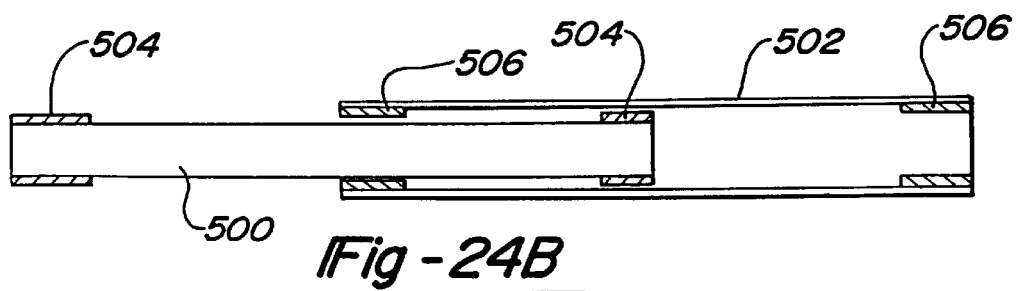

The telescoping rails of the present invention have sufficient clearance between each stationary rail and movable rail disposed thereon to accommodate the non-straightness of the rails. This clearance can cause excessive end play of the extended rail as the extended rail moves toward its totally extended position. Thus, it may be desirable, in the present invention, to provide a system for stabilizing the extended rail as it moves to it fully extended position. FIG. 24A and 24B schematically represent a stationary rail 500 and a movable rail 502. Stationary rail 500 is adapted to be secured to a work table in a similar manner shown previously in FIG. 20 for stationary rail 356. Movable rail 502 telescopically engages stationary rail 500 in a similar manner shown previously for movable rail 360 with sufficient clearance maintained between the movable and stationary rail to accommodate any non-straightness. Each end of stationary rail 500 would include an outwardly extending shim 504 and each end of movable rail 502 would include an inwardly extending shim 506. Shims 504 contact the inner surface of outer rail 502 while shims 506 contact the outer surface of inner rail 500. These contact points help stabilize the movable rail against vertical movement in any extended position of the movable rails. However, shims 504 and 506 must be provided in a manner which allows for movable rail 502 to move from the position shown in FIG. 24A to that shown in 24B. That is, it is necessary for inwardly extending shims 506 to pass through outwardly extending shims 504.

FIG. 25A illustrates a construction of stationary rail 500 and movable rail 502 which provides shims 504 and 506 which pass through each other. Stationary rail 500 incorporates a steel skeleton 501 and a covering portion 503. Covering portion 503 is preferably manufactured from a nylon based material and Is injection molded over skeleton 501 as shown. Covering portion 503 preferably extends over the entire length of rail 500 and defines a pair of pads 508 on the upper and lower surfaces of stationary rail 500 at each end. Each pair of pads 508 defines a channel 510 extending longitudinally along the length of stationary rail 500 for a short distance. The pair of pads 508 are designed such that they slidingly engage the interior surfaces of movable rail 502 to reduce or eliminate the clearances between the two rails. Pads 508 also could be a separate component assembled to skeleton 501.

FIG. 25B illustrates movable rail 502 incorporating inwardly extending pads 512 integrally formed as a part of movable rail 502 at each end. One pad 512 is formed into an upper wall of rail 502 while the second pad 512 is formed into the lower wall of rail 502. Pads 512 may be formed by stamping the rails inwardly in the roll forming process of the rails. Pads 512 are positioned to align with channels 510 defined by pads 508 such that movable rail 502 is allowed to move outwardly beyond stationary rail 500 in both directions as is schematically illustrated in FIGS. 24A and 24B. Pads 508 function as shims 504 and pads 512 function as shims 506 as described with reference to FIGS. 24A and 24B. Thus, the contact of pads 508 and 512 with outer rail 502 and inner rail 500, respectively, stabilizes the outer rails in the extended position. In addition, it is within the scope of the present invention to form pad 508 into each end of rail 500 by stamping, as described below for pads 518 and movable rail 502.

FIG. 26 illustrates a preferred embodiment of a stabilizing system according to the present invention. A stationary rail 520 defines a pair of slots 522 extending parallel to each other and longitudinally into stationary rail 520 to define a tab 524. Lower wall 528 incorporates an outwardly stamped protrusion 525. Disposed between tab 524 and protrusion 525 is a wedge assembly 530. Wedge assembly 530 comprises a base 532, a wedge 534 and a bolt 536. Base 532 is a C-shaped component having upper, lower and vertical legs linked by a pair of living hinges 538 and a threaded bore 540. Base 532 is inserted into the open end of rail 520 such that one living hinge 538 is adjacent upper wall 526 and the second living hinge 538 is adjacent lower wall 528. The width of base 532 is selected to be equal to or slightly less than the width of tab 524. After insertion of base 532 into rail 520, wedge 534 is positioned into the open portion of base 532 and bolt 536 is inserted through a hole 542 in wedge 534 and threadably engaged with threaded bore 540. As bolt 536 is tightened, wedge 534 reacts against the open upper and lower legs of C-shaped base 532 to expand the open legs which react against tab 524 to urge tab 524 outward to reduce or eliminate the clearance between stationary rail 520 and a movable rail (not shown). The expansion of C-shaped base 532 is preferably set prior to the movement of the movable rail or at the manufacturing facility but the expansion can be set by the operator at any time simply by accessing bolt 536. Base 532 is a molded plastic part In another embodiment, base 532 and wedge 534 can be molded integrally such that wedge 534 is linked to the upper and lower legs by a thin ligament.

As shown in FIGS. 13 and 14, front bearing mount 346 is rigidly secured to the underside of work table 14 using the pair of screws 350. Rear bearing mount 348 is secured to adjustment plate 352 using the pair of screws 350 and adjustment plate 352 is rigidly secured to the underside of work table 14 using the pair of screws 351. The connection of bearing mounts 346 and 348 thus rigidly secure pinion shaft 344 to work table 14. Such a rigid connection may result in backlash when the movable rails are moved.

Figure 28:
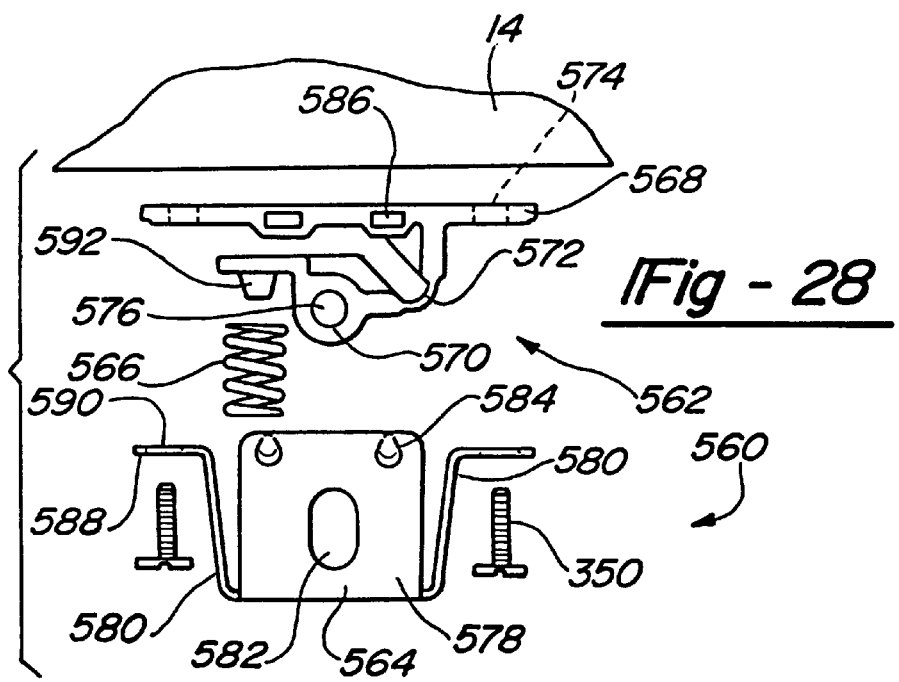
FIG. 28 is a blown apart side view of a spring loaded bearing mount in accordance with the present invention.
Figure 29:
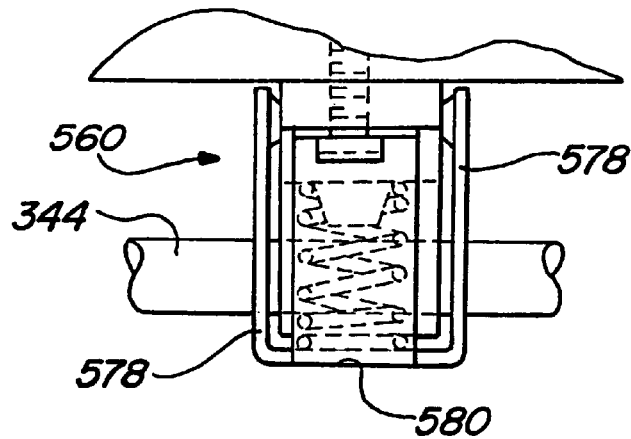
FIG. 29 is an end view of the spring loaded bearing mount shown in FIG. 28 in the assembled condition.

FIGS. 28 and 29 illustrate an alternative embodiment for the bearing mount. Bearing mount 560 spring loads or biases pinion shaft 344 upwardly towards table 14 such that the pinions are urged against the racks, as shown with respect to springs 156 in FIG. 9. However, bearing mounts 560 allow only a limited vertical movement, thereby avoiding backlash and simultaneously ensuring that the pinion gears do not become disengaged from the rack.

Bearing mount 560 comprises a plastic bearing 562, a sheet metal cover 564 and a coil spring 566. Bearing 562 is preferably manufactured from a low friction plastic such as Delrin® manufactured by DuPont and includes a base 568, a guide bearing 570 and a flexible arm or hinge 572 disposed between base 568 and guide bearing 570. Base 568 defines a pair of apertures 574 which accept screws 350 when bearing mount 560 is being secured to the underside of work table 14 or to adjustment plate 352. Guide bearing 570 defines an aperture 576 extending through bearing 570 for accepting pinion shaft 344. Guide bearing 570 is pivotable about a horizontal axis with respect to base 568 due to the connection to base 568 by hinge 572. Bearing 562 thus allows vertical movement of shaft 344 but eliminates lateral movement of the shaft.

Sheet metal cover 564 is a cup shaped member defining a pair of side walls 578 and a pair of end walls 580. Side walls 578 each define a slotted aperture 582 which aligns with aperture 576 of bearing 570 after assembly of bearing mount 560. Side walls 578 each also define a pair of detents 584 which snap into a corresponding pair of slots 586 located within base 568 to retain the assembly of bearing mount 560 prior to the insertion of screws 350. End walls 580 each define a flange 588 having an aperture 590 which is designed to align with a respective aperture 574 for securing bearing mount 560 to the under side of work table 14. Coil spring 566 is disposed between cover 564 and bearing 562 and operates to urge guide bearing 570 towards base 568, and towards work table 14. A spring retainer 592 is integrally formed with guide bearing 570.

The assembly of bearing mount 560 begins by locating coil spring 566 on retainer 592 and inserting plastic bearing 562 into cover 564. Bearing 562 is inserted into cover 564 until the two pairs of detents 584 snap into their corresponding slots 586 to retain bearing 562 within cover 564 against the load exerted by coil spring 566. Pinion shaft 344 can then be inserted through aligned apertures 582 and 576 and the assembly of bearing mount 560 and pinion shaft 344 can be secured to the under side of work table 14 or adjustment plate 352 by inserting screws 350 through aligned apertures 574 and 590 and threadably engaging them with their respective threaded bores. Accordingly, shaft 344 is urged towards table 14 by coil spring 566 and thus, pinions 340, 342 are urged into engagement with rack 378. However, vertical movement of shaft 344 and thus pinions 340, 342 is limited by apertures 576, precluding the pinions from becoming disengaged from the rack.

FIGS. 30A through 30C schematically illustrate another embodiment of the present invention which allows the synchronized movement of the telescoping rail assemblies for a table saw. FIG. 30A schematically illustrates a work table 614 which is similar to work table 14 described above. A pair of telescoping tubular side rail assemblies 634 and 636 are secured to work table 614. Side rail assemblies 634 and 636 are similar in construction to side rail assemblies 334 and 336 in that they comprise an inner rail 656, a slide strip (not shown) and an outer rail 660. Side rail assemblies 634 and 636 are different from side rail assemblies 334 and 336 in that outer rail 660 of each side rail assembly does not include rack 376. Instead of utilizing a rack and pinion system to ensure the synchronous movement of rail assemblies 634 and 636, a system of cables and pulleys designated generally by the reference numeral 610 are used.

System 610 comprises four pulleys 612a, 612b, 612c and 612d disposed at each corner of the undersurface of work table 614 and a pair of cables 616a and 616b extending between outer rails 660 and being circuitously routed through pulleys 612a–612d. As shown in FIG. 30A, cable 616a extends from a first end 662 of outer rail 660 associated with rail assembly 634, winds around pulley 612b, winds around pulley 612d and terminates at an opposite end 664 of outer rail 660 associated with rail assembly 636. Cable 616b extends from an opposite end 666 of outer rail 660 associated with rail assembly 634, winds around pulley 612a, winds around pulley 612c and terminates at a first end 668 of outer rail 660 associated with rail assembly 636. Thus, when rail assemblies 634 and 636 are moved to the left as shown in FIG. 30B, the synchronous movement of the rail assemblies is provided by cables 616a and 616b and their circuitous route through pulleys 612a–612d. In a similar manner, when rail assemblies 634 and 636 are moved to the right as shown in FIG. 30C, the synchronous movement of the rail assemblies is again provided by cables 616a and 616b and their circuitous routing through pulleys 612a–612d. Since movement of one rail 660 forces an equal movement of the other rail 660 due to the fact that each cable is connected to both rails 660, the fence is maintained parallel to the saw blade.

FIGS. 31A through 31C illustrate another embodiment of a cable synchronous assembly which is designated generally by the reference numeral 700. Cable synchronous assembly 700 comprises work table 714, side rail assemblies 634 and 636, tension adjustment assembly 702, alignment adjustment assembly 704 and cables 716a and 716b. Cable 716a extends from first end 662 of outer rail 660 associated with rail assembly 634, winds through tension adjustment assembly 702, through alignment adjustment assembly 704 and terminates at opposite end 664 of outer rail 660 associated with rail assembly 636. Cable 716b extends from opposite end 666 of outer rail 660 associated with rail assembly 634, winds through tension adjustment assembly 702, through alignment adjustment assembly 704 and terminates a first end 668 of outer rail 660 associated with rail assembly 636. Thus, rail assemblies can be moved to the left or to the right (as shown in FIG. 31A) with the synchronous movement of rail assemblies 634 and 636 being provided by cables 716a and 716b, tension adjustment assembly 702 and alignment adjustment assembly 704.

Referring now to FIG. 31B, tension adjustment assembly 702 comprises a mounting plate 720, a pair of pivoting arms 722, a pair of pulleys 724 and an adjustment screw 726. Mounting plate 720 is secured to the under side of table 714 by a plurality of bolts 728 and a pivot bolt 730. Pivot bolt 730 extends generally perpendicular, outward from mounting plate 720 to provide a pivotal mounting for pivoting arms 722. Each pivoting arm 722 pivots about bolt 730 and rotatably supports a respective pulley 724. Adjustment screw 726 includes a knob 732, a first threaded portion 734, an anchoring flange 736 and a second threaded portion 738.

Adjustment screw 726 is rotatably secured to mounting plate 720 by anchoring flange 736 being rotatably received by an anchor 740 fixedly secured to or an integral part of mounting plate 720. First threaded portion 734 threadingly engages a nut 742 which is secured to one of the pivoting arms 722 such that rotation of adjustment screw 726 causes pivotal movement of its respective pivoting arm 722. Second threaded portion 738 threadingly engages a nut 744 which is secured to the other pivoting arm 722 such that rotation of adjustment screw 726 causes pivotal movement of its respective pivoting arm 722. As shown in FIG. 31B, threaded portion 734 and nut 742 are threaded opposite to threaded portion 738 and nut 744. (One is a fight handed thread and the other is a left handed thread). Thus, rotational movement of adjustment screw 726 will cause pivoting arms 722 to pivot in opposite directions causing a tightening or loosening of cables 716a and 716b depending on which direction adjustment screw 726 is rotated.

Referring now to FIG. 31C, alignment adjustment assembly 704 comprises an additional mounting plate 720, an additional pair of pivoting arms 722, an additional pair of pulleys 724 and an adjustment screw 726'. Thus, alignment adjustment assembly 704 is similar to the above described tension adjustment assembly 702 except that adjustment screw 726 has been replaced by adjustment screw 726'. Adjustment screw 726' includes a knob 732, a first threaded portion 734', anchoring flange 736 and a second threaded portion 738'. Adjustment screw 726' is rotatably secured to mounting plate 720 in a similar manner to that described above for adjusting screw 726. First threaded portion 734' threadably engages a nut 742' which is secured to one of the pivoting arms 722 such that rotation of adjustment screw 726' causes pivotal movement of its respective pivoting arm 722. Second threaded portion 738' threadingly engages a nut 744' which is secured to the other pivoting arm 722 such that rotation of adjustment screw 726' causes pivotal movement of its respective pivoting arm. As shown in FIG. 31C, threaded portion 734' and nut 742' are threaded the same as threaded portion 738' and nut 744' (both are right or left handed thread). Thus, rotational movement of adjustment screw 726' will cause pivoting arms 722 to pivot in the same direction causing lateral adjustment to rail assembly 636 which adjusts the alignment between rail assembly 634 and rail assembly 636. This adjustment causes one end of fence assembly 338 to move relative to the other, thereby allowing the parallelism between the blade and the fence to be adjusted.

Figure 32A:
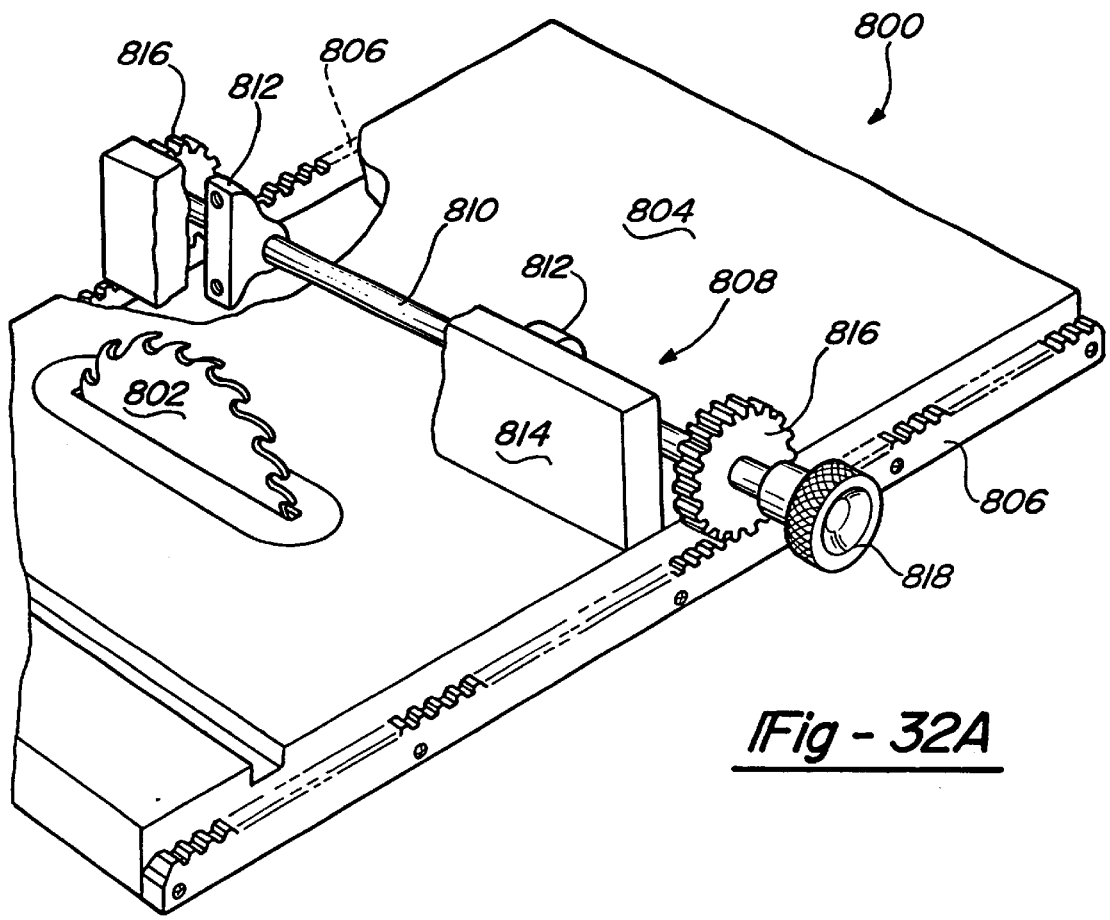
FIGS. 32A–32C are perspective views illustrating additional embodiments of a rack and pinion adjustable fence assembly.
Figure 32B:
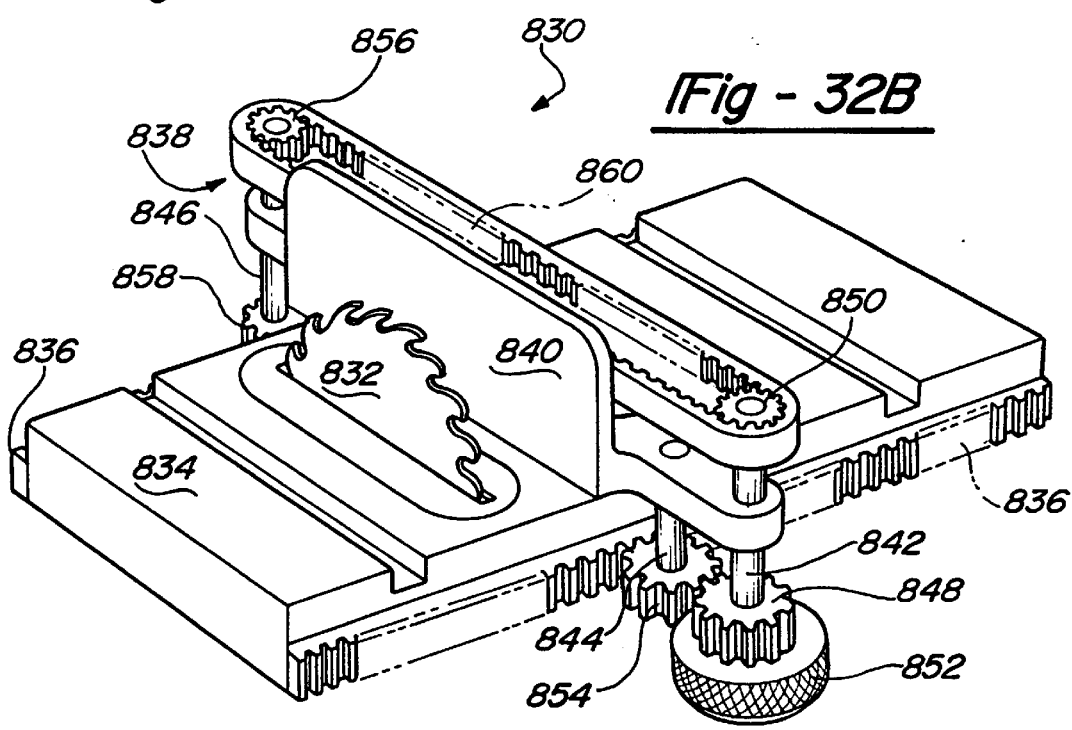
Figure 32C:
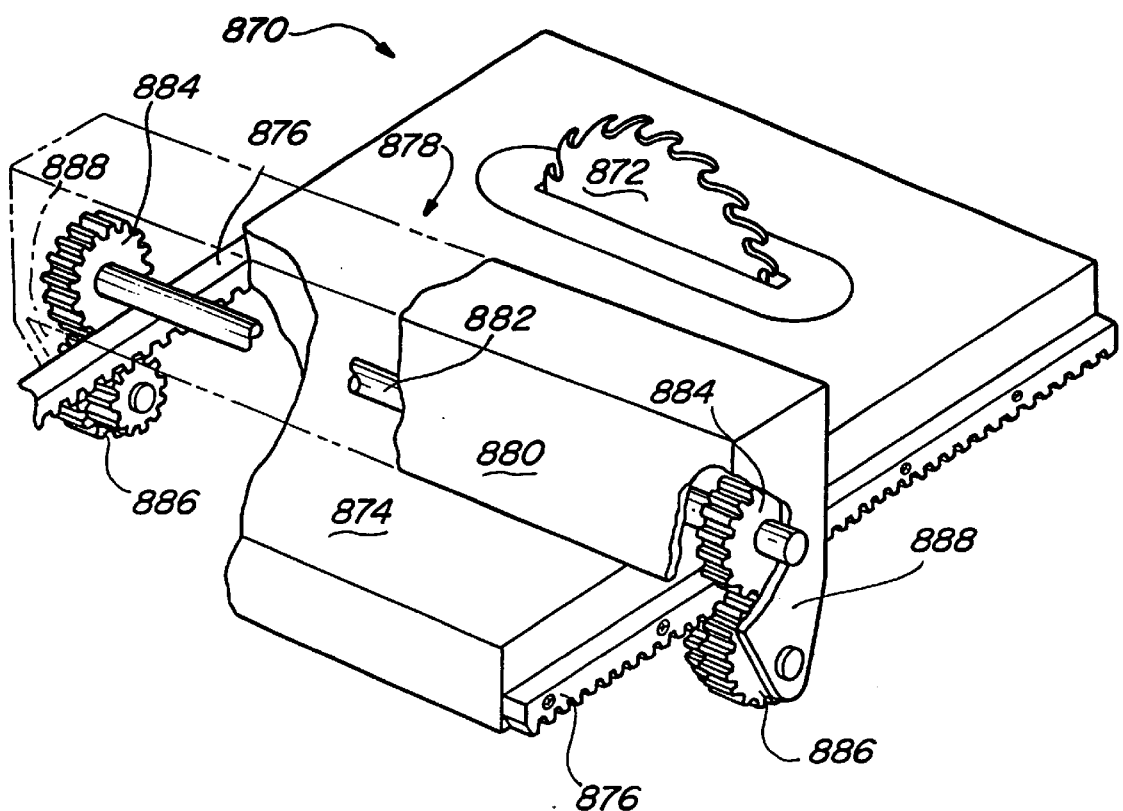

FIGS. 32A-C illustrate additional embodiments of a rack and pinion synchronous adjustment system where the fence is maintained in a parallel relationship to the saw blade but the fence cannot be adjusted beyond the surface of the work table.

FIG. 32A illustrates a table saw 800 comprising a powered saw blade 802, a work table 804, a pair of racks 806, and a fence assembly 808. Racks 806 are fixedly secured to opposite sides of work table 804 and extend longitudinally along the entire length of work table 804 generally perpendicular to saw blade 802. Fence assembly 808 comprises a pinion shaft 810, a pair of bearing mounts 812, an elongated fence 814, a pair of pinion gears 816 and a knob 818. Pinion shaft 810 extends across work table 804 generally parallel to saw blade 802. Pinion shaft 810 extends through and is rotatable with respect to each of the bearing mounts 812. Elongated fence 814 is fixedly secured to bearing mounts 812 such that it extends generally parallel to pinion shaft 810 and saw blade 802. Pinion gears 816 are fixedly mounted to pinion shaft 810 at a position outboard of fence 814 and spaced a distance equal to the distance between racks 806 when fence assembly 808 is located on table saw 800. Knob 818 is fixedly secured to pinion shaft 810 generally outboard of one of the pinion gears 816 at the front side of table saw 800. When fence assembly 808 is located on table saw 800 as shown in FIG. 32A, rotation of knob 818 causes simultaneous movement of pinion shaft 810 and pinion gears 816. The simultaneous rotation of pinion gears 816 causes lateral motion of fence assembly 808 with respect to saw blade 802. The rack and pinion relationship between fence assembly 808 and work table 804 ensures the parallel movement of fence assembly 808. Alternatively, movement of fence 814 along the surface of table 804 causes an equal rotation of pinion gears 816, ensuring that both sides of fence 814 move an equal distance, and thereby maintaining the parallelism between fence 814 and blade 802.

FIG. 32B illustrates a table saw 830 comprising a powered saw blade 832, a work table 834, a pair of racks 836 and a fence assembly 838. Racks 836 are fixedly secured to opposite sides of work table 834 and extend longitudinally along the entire length of work table 834 generally perpendicular to saw blade 832. Fence assembly 838 comprises an elongated fence 840, a gear shaft 842, an idler shaft 844, and a gear shaft 846. Elongated fence 840 is located atop of work table 834 and extends generally parallel to saw blade 832. Geared shaft 842 Is rotatably secured to fence 840 at the front of table saw 830. Geared shaft 842 Includes a fixedly secured front drive gear 848, a fixedly secured rear drive gear 850 and a knob 852. Idler shaft 844 is also rotatably secured to fence 840 at the front of table saw 830. Idler shaft 844 includes a front pinion gear 854 which meshes with both front drive gear 848 and one of the racks 836. Geared shaft 846 is rotatably secured to fence 840 at the rear of table saw 830. Geared shaft 842 includes a fixedly secured rear drive gear 856 and a fixedly secured rear pinion gear 858. Rear pinion gear 858 meshes with the other rack 836. Rear drive gear 850 is drivingly connected to rear drive gear 856 by an endless toothed belt 860. When fence assembly 838 is located on table saw 830 as shown in FIG. 32B, rotation of knob 852 simultaneously rotates front drive gear 848 and rear drive gear 850. The rotation of front drive gear 848 causes rotation of front pinion gear 854 which causes lateral movement of the front of fence assembly 838. The simultaneous rotation of rear drive gear 850 causes rotation of rear drive gear 856 through belt 860 which cause rotation of rear pinion gear 858 which causes lateral movement of the rear of fence assembly 838. The simultaneous rotation of both front pinion gear 854 and rear pinion gear 858 results in the parallel movement of fence assembly 838 along work table 834.

FIG. 32C illustrates a table saw 870 comprising a powered saw blade 872, a work table 874, a pair of racks 876 and a fence assembly 878. Racks 876 are fixedly secured to opposite sides of work table 834 and extend longitudinally along the entire length of work table 834 generally perpendicular to saw blade 872. Fence assembly 878 comprises an elongated fence 880, a pinion shaft 882, a pair of drive gears 884 and a pair of compound pinion gears 886. Elongated fence 880 is a hollow rectangular structure which extends across work table 874 generally parallel to saw blade 872. The length of fence 880 is designed to allow each end to extend beyond the width of work table 874 and racks 876 and each end of fence 880 includes a flange 888 which extends down over racks 876 to rotatably mount compound pinion gears 886. Pinion shaft 882 is rotatably mounted to both ends of fence 880 and thus also extends generally parallel to saw blade 872. Drive gears 884 are fixedly mounted on pinion shaft 882 at a position adjacent the ends of fence 880. Compound pinion gears 886 are each rotatably mounted to a respective flange 888 such that they are each meshed with a respective drive gear 884 and a respective rack 876. A knob (not shown) is fixedly secured to pinion shaft 882 at the front of table saw 870. Rotation of the knob causes simultaneous rotation of drive gears 884 which causes simultaneous rotation of compound pinion gears 886 which causes simultaneous lateral movement of the front and rear of fence assembly 878. The simultaneous rotation of both compound pinion gears 886 results in parallel movement of fence assembly 878 along work table 834.

While the above detailed description describes the preferred embodiment of the present invention, it should be understood that the present invention is susceptible to modification, variation and alteration without deviating from the scope and fair meaning of the subjoined claims.

What is claimed is:

1. A machine tool having a cutting tool defining a normal cutting direction, said machine tool comprising:
    a base;
    a stationary rail connected to said base, said stationary rail having a first end and a second end;
    a movable rail slidingly disposed on said stationary rail, said movable rail being generally equal in length to said stationary rail and being movable to a first position where a first portion of said movable rail extends beyond said first end and to a second position where a second portion of said movable rail extends beyond said second end;
    a rack provided on one of said stationary and said movable rails;
    a fence positionable on said movable rail such that when said fence is positioned on said first portion of said movable rail and said first portion of said movable rail is extending beyond said first end of said stationary rail, said fence does not overlap said base, and when said fence is positioned on said second portion of said movable rail and said second portion of said movable rail is extending beyond said second end of said stationary rail, said fence does not overlap said base; and
    a pinion shaft assembly rotatably secured to said base, said pinion shaft assembly including a pinion gear matingly engaging said rack.

2. The machine tool according to claim 1 wherein, said pinion shaft assembly includes a shaft extending though said fence.

3. The machine tool according to claim 1 wherein, said rack defines a plurality of rack teeth, said end tooth bin disposed at one end of said rack, said end tooth engaging said pinion gear to limit said movement of said fence.

4. The machine tool according to claim 1, wherein said movable rail includes a projection for contacting said stationary rail.

5. The machine tool according to claim 1, wherein said stationary rail includes a projection for contacting said movable rail.

6. A machine tool defining a first direction and comprising;

a base;

a first and a second stationary rail connected to said base, each of said first and second stationary rails having a first end and a second end;

a first and a second movable rail slidingly disposed on said first and second stationary rails, respectively, said first movable rail being generally equal in length to said first stationary rail and being movable to a first position where a first portion of said first movable rail extends beyond said first end of said first stationary rail and to a second position where a second portion of said first movable rail extends beyond said second end of said first stationary rail, said second movable generally equal in length to said second stationary rail and being movable to a first position where a first portion of said second movable rail extends beyond said first end of said second stationary rail and to a second position where a second portion of said second movable rail extends beyond said second end of said second stationary rail;

a first rack provided on one of said first stationary and said first movable rails;

a second rack provided on one of said second stationary and said second movable rails;

a pinion assembly including a shaft and a first and a second pinion gear matingly engaging said first and second racks, respectively; and a fence positionable on said first and second movable rails such that when said fence is positioned on said first portion of said first movable rail and said first portion of said first movable rail is extending beyond said first end of said first stationary rail, said fence does not overlap said base, and when said fence is positioned on said second portion of said first movable rail and said second portion of said first movable rail is extending beyond said second end of said first stationary rail, said fence does not overlap said base.

7. The machine tool according to claim 6 wherein, said first movable rail is selectively lockable to said first stationary rail and said second movable rail is selectively lockable to said second stationary rail.

8. The machine tool according to claim 6 further comprising a first over-center latch for connecting said fence to said first movable rail and a second over-center latch for connecting said fence to said second movable rail.

9. The machine tool according to claim 8, wherein said movable rail includes a projection for contacting said stationary rail.

10. The machine tool according to claim 6 wherein, said first movable rail includes a first locating pin, said second movable rail includes a second locating pin, said fence defines a first locating slot and said fence defines a second locating slot, said first locating slot engaging said first locating pin to properly position said fence with respect to said first movable rail, said second locating slot engaging said second locating pin to properly position said fence with respect to said second movable rail.

11. The machine tool according to claim 6 further comprising a biasing said pinion assembly towards said movable rails.

12. The machine tool according to claim 6 further comprising:

a first bearing mount secured to said base;

an adjustment plate having slotted apertures and mounted to said base by fasteners extending through said slotted apertures; and a second bearing mount secured to said adjustment plate wherein, said shaft extends through and is supported by said bearing mounts.

13. The machine tool according to claim 6, wherein said first movable rail includes a projection for contacting said first stationary rail.

14. The machine tool according to claim 6, wherein said first stationary rail includes a projection for contacting said first movable rail.

15. The machine tool according to claim 14, wherein said first movable rail includes a projection for contacting said first stationary rail.

* * * * *

UNITED STATES PATENT AND TRADEMARK OFFICE
CERTIFICATE OF CORRECTION

PATENT NO.  : 6,250,190 B1  
DATED       : June 26, 2001  
INVENTOR(S) : Warren A. Ceroll et al.

It is certified that error appears in the above-identified patent and that said Letters Patent is hereby corrected as shown below:

Title page,
Item [57], ABSTRACT,
Line 6, delete "Aeach" and insert -- A movable rail telescopically engages each --.

Column 24,
Line 65, "bin" should be -- being --.

Column 25,
Line 22, after "movable", insert -- rail being --.
Line 23, after "biasing", insert -- member for biasing --.

Signed and Sealed this

First Day of July, 2003

JAMES E. ROGAN
*Director of the United States Patent and Trademark Office*